(12) United States Patent
Kusama et al.

(10) Patent No.: US 7,012,623 B1
(45) Date of Patent: Mar. 14, 2006

(54) IMAGE PROCESSING METHOD AND APPARATUS

(75) Inventors: Kiyoshi Kusama, Kawasaki (JP); Kentaro Matsumoto, Higashikurume (JP); Kunihiro Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/537,687

(22) Filed: Mar. 29, 2000

(30) Foreign Application Priority Data

| Mar. 31, 1999 | (JP) | ............................................ | 11-093486 |
| Mar. 31, 1999 | (JP) | ............................................ | 11-093487 |
| Feb. 3, 2000 | (JP) | ...................................... | 2000-026546 |
| Feb. 15, 2000 | (JP) | ...................................... | 2000-036975 |

(51) Int. Cl.
  *G09G 5/00* (2006.01)

(52) U.S. Cl. ......................... 345/634; 345/638; 345/629

(58) Field of Classification Search ................. 345/634, 345/638, 629
  See application file for complete search history.

(56) References Cited

U.S. PATENT DOCUMENTS

| 5,999,662 | A | * | 12/1999 | Burt et al. | ................... | 382/284 |
| 6,075,905 | A | * | 6/2000 | Herman et al. | ............. | 382/284 |
| 6,137,498 | A | * | 10/2000 | Silvers | ........................ | 345/629 |
| 6,173,087 | B1 | * | 1/2001 | Kumar et al. | ............... | 382/284 |
| 6,266,068 | B1 | * | 7/2001 | Kang et al. | .................. | 345/629 |

FOREIGN PATENT DOCUMENTS

| JP | 11-345310 | 2/1992 |
| JP | 7-30745 | 1/1995 |
| JP | 11-345308 | 9/1998 |
| WO | WO 95/28794 | 10/1995 |

* cited by examiner

*Primary Examiner*—Motilewa Good-Johnson
(74) *Attorney, Agent, or Firm*—Fitzpatrick, Cella, Harper & Scinto

(57) ABSTRACT

An image as a basis of a mosaic image is segmented into M×N areas by the process shown in FIG. 4 (S300), and the image characteristics of the segmented areas (S301), and those of source images (S305) are obtained. When the source image is a moving image, the image characteristics of that moving image are obtained from those of a plurality of still images in the moving image (S304). Source images corresponding to the segmented areas are determined (S309) and pasted (S310), thus generating a mosaic image.

4 Claims, 20 Drawing Sheets

IMAGE PROCESSING METHOD AND APPARATUS

FIELD OF THE INVENTION

The present invention relates to an image processing apparatus and method and, more particularly, to an image processing apparatus and method for generating a mosaic image by combining source images.

The present invention also relates to an image processing apparatus and method for managing a plurality of source moving images and generating an image that imitates an original image by combining arbitrary moving images from the plurality of source moving images.

BACKGROUND OF THE INVENTION

As is known, mosaicking is "a design made by inlaying a combination of small pieces of various colors of stone, glass, marble, and the like into a floor, wall, or the like, or a technique of obtaining such design" (Gendai Kokugo Jiten, Sanseido).

Using this technique, a design or photo image can be formed by combining a large number of photo images.

However, in an image generation method based on conventional mosaicking, source images are limited to still images, and moving images cannot be used as sources, and a moving mosaic image (which changes along with the elapse of time) cannot be generated.

Also, in the image generation method based on conventional mosaicking, a very large number of source images must be prepared, and source images corresponding to image characteristics of individual areas must be selected from those images upon generating a mosaic image.

Therefore, even when a large number of source images are prepared, only some partial source images are used, and most of images are not used, i.e., most of source images prepared with efforts stay unseen.

SUMMARY OF THE INVENTION

The present invention has been made to solve the aforementioned problems, and has as its object to provide an image processing apparatus and method, which can directly use moving images as source images of a mosaic image.

It is another object of the present invention to provide an image processing apparatus and method, which allow the user to confirm many source images by displaying remaining source images after a mosaic image is generated.

It is still another object of the present invention to provide an image processing apparatus and method, which can display a mosaic image after a predetermined number of source images are displayed, even when source images of tiles change all the time.

It is still another object of the present invention to provide an image processing apparatus and method, which changes a mosaic image as a whole from a one with higher image quality to a one with lower image quality by displaying remaining source images after a mosaic image is generated, and allow the user to confirm many source images during that interval.

It is still another object of the present invention to provide an image processing apparatus and method, which can generate not only a still image but also a moving mosaic image by a simple process.

It is still another object of the present invention to provide an image processing apparatus and method, which can display generate and display a moving mosaic image even when a computer system has low image processing performance.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments according to the present invention will be described in detail hereinafter with reference to the accompanying drawings.

Figure 7:
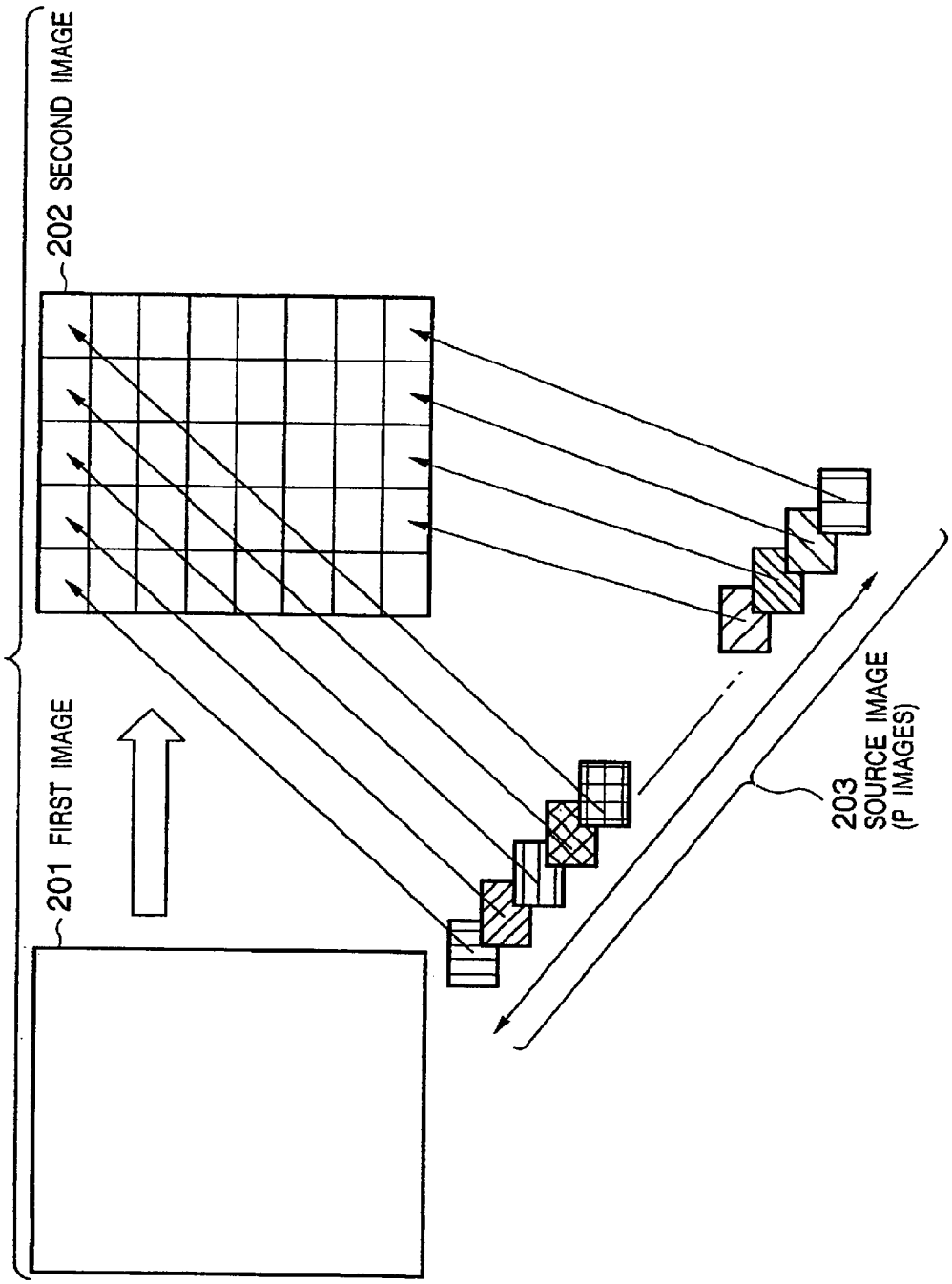
FIG. 7 is a view for explaining an image composition method based on mosaicking.

FIG. 7 shows the relationship among a plurality of types of images used in mosaicking. A mosaic image processing technique will be explained below with reference to FIG. 7.

Referring to FIG. 7, a first image 201 is an original design or image from which an image is composited by mosaicking. A second image 202 is an image obtained by compositing or stitching together a plurality of small images by mosaicking.

Source images 203 are those composited into the second image 202, and P images are prepared in the example shown in FIG. 7. The number P of source images 203 is normally a value large enough to prepare colors and textures required for obtaining the second image 202.

For each segmented image area, the R, G, and B average densities are computed by:

$$Rd\_av = 1/p*q \cdot \Sigma Ri$$

$$Gd\_av = 1/p*q \cdot \Sigma Gi$$

$$Bd\_av = 1/p*q \cdot \Sigma Bi$$

Note that "d" is an abbreviation for "destination".

The R, G, and B average densities of each of P source images to be pasted on each segmented area are computed by:

$$Rs\_av = 1/p*q \cdot \Sigma Ri$$

$$Gs\_av = 1/p*q \cdot \Sigma Gi$$

$$Bs\_av = 1/p*q \cdot \Sigma Bi$$

Note that "s" is an abbreviation for "source".

Distances ΔE between the R, G, and B tristimulus values of each segmented area and source image are computed, and a source image with the smallest distance is selected as that to be pasted on the corresponding segmented area.

[First Embodiment]

Figure 1:
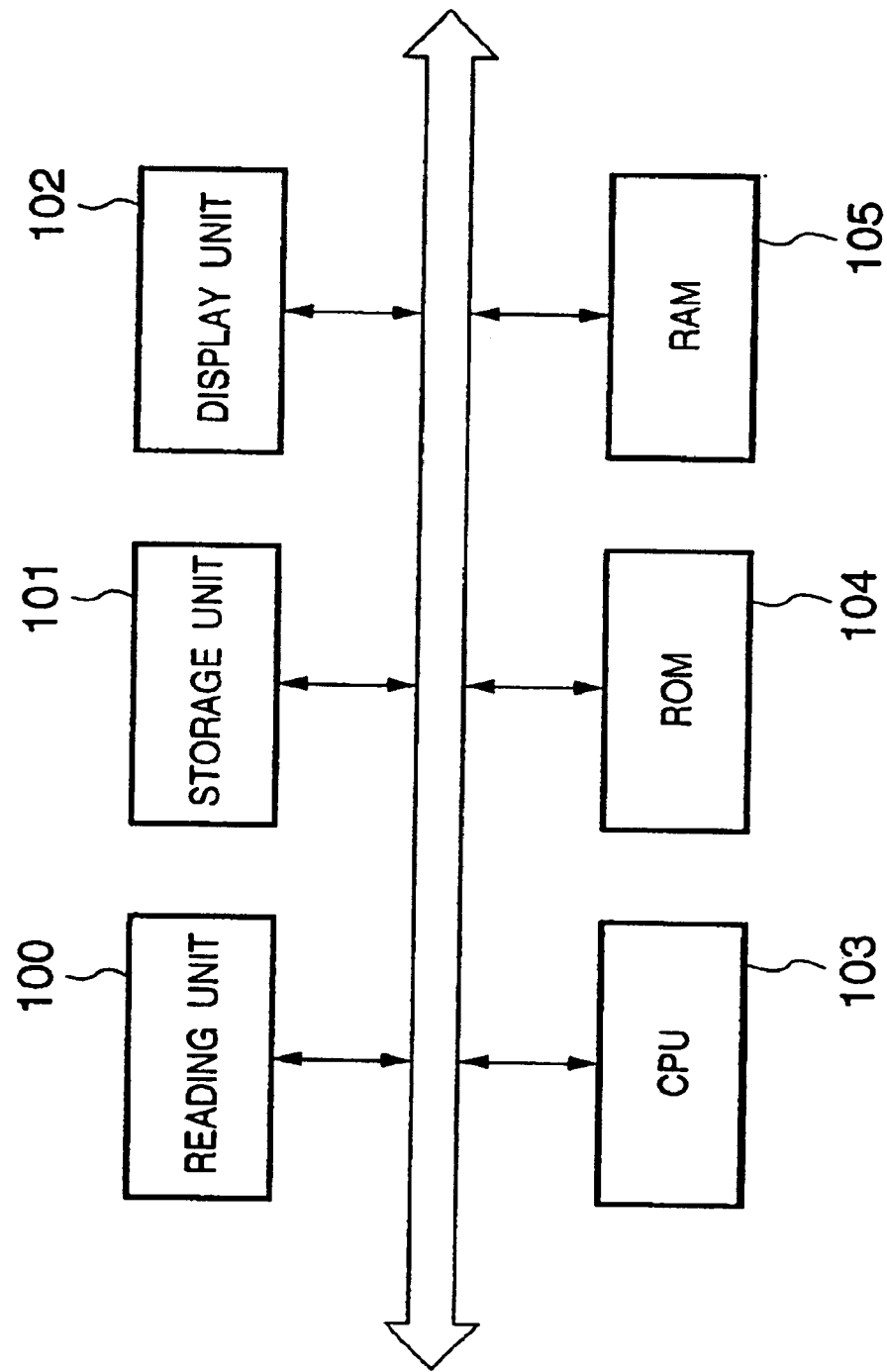
FIG. 1 is a block diagram showing the arrangement of a mosaic image generator according to the first embodiment of the present invention.

FIG. 1 is a block diagram showing a mosaic image generator that constructs an image processing apparatus according to the first embodiment of the present invention.

Referring to FIG. 1, reference numeral 100 denotes a reading unit, which can read an image to be processed using a scanner, video player, or the like. Reference numeral 101 denotes a storage unit which can store a processed image and the like; 102, a display unit for displaying the processed image and the like; 103, a control unit (CPU) for controlling the entire generator of this embodiment in accordance with control sequences which are stored in, e.g., a ROM 104 and are shown in the flow charts (to be described later); 104, a ROM for storing the control sequences and the like of the CPU 103; and 105, a RAM for storing intermediate processing results and the like.

The storage unit 101 can store moving images and still images, and normally uses a database. The display unit 102 can display an image stored in the storage unit 101, and an image read by the reading unit 100.

Note that the mosaic image generator of the first embodiment has various building components in addition to the above-mentioned building components, but they do not constitute the gist of the present invention, and a detailed description thereof will be omitted.

In this embodiment as well, a mosaic image is generated in basically the same manner as in the aforementioned example shown in FIG. 7. Note that this embodiment can generate a mosaic image based on not only still images but also moving pictures, as will be described later.

Also, in this embodiment, the first image 201 shown in FIG. 7 basically serves as an original design or image from which an image composited by mosaicking, and the second image 202 is obtained by compositing a plurality of small images by mosaicking.

Source images 203 are those composited into the second image 202. In the example shown in FIG. 7, the size of P images is the same as that of a tile. However, the size of each source image need not always match the tile size, and all P images need not always have equal sizes.

In this case, the size of each source image must be converted into a tile size upon pasting that source image onto the tile.

An image composition method based on mosaicking according to this embodiment will be explained below with reference to FIGS. 2, 3, and 4.

An operation for generating a mosaic image in the mosaic image generator with the above arrangement will be explained below with reference to the flow chart shown in FIG. 4.

Figure 4:
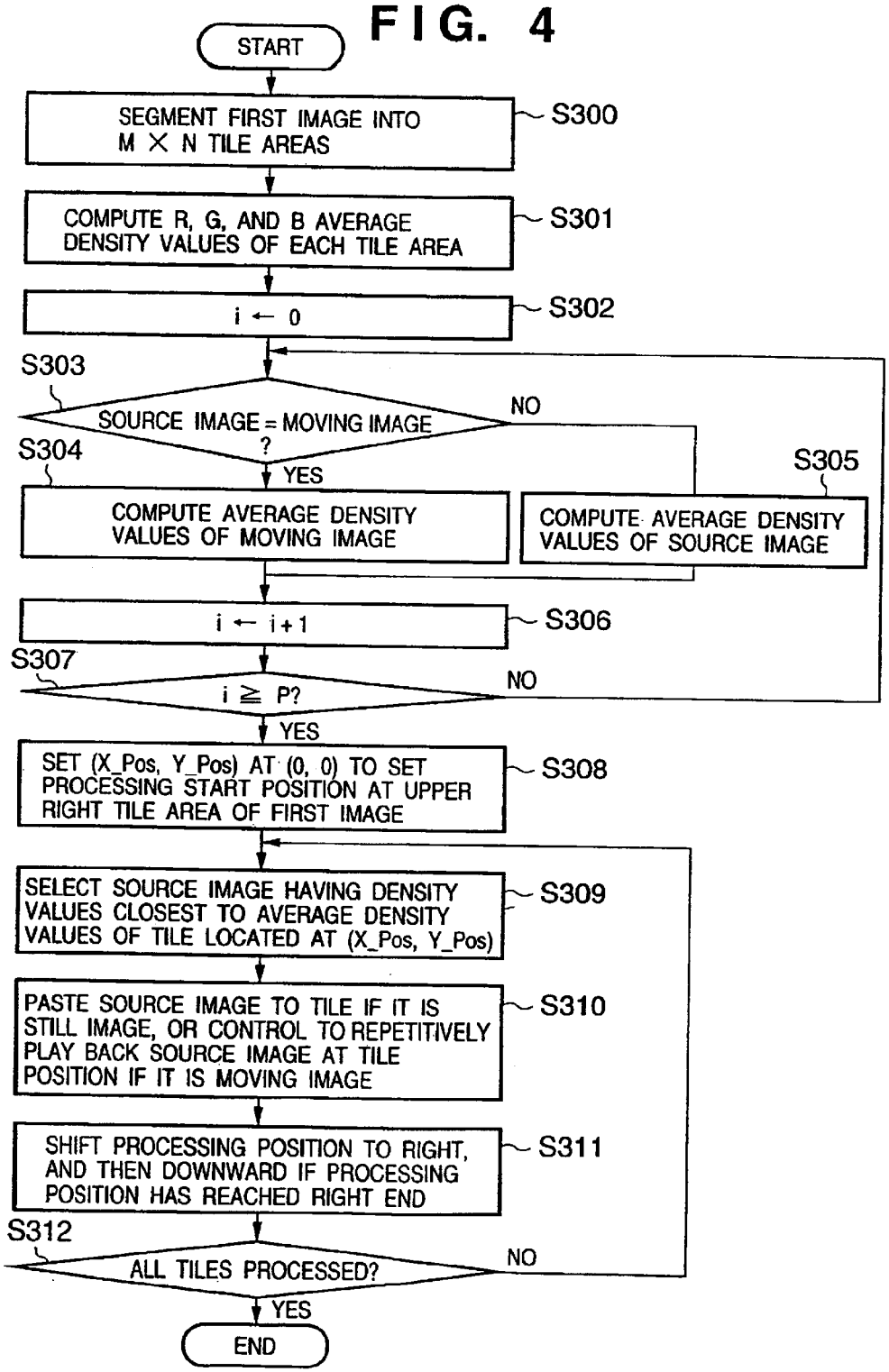
FIG. 4 is a flow chart showing a mosaic image generation process in the first embodiment of the present invention.

FIG. 4 is a flow chart showing a mosaic image generation method according to the first embodiment of the present invention.

Referring to FIG. 4, the first image is segmented into M×N tiles in step S300. As a result, M×N rectangular tiles TL(0, 0), TL(1, 0), TL(2, 0), . . . , TL(2, 4), and TL(3, 4) are generated.

Figure 2:
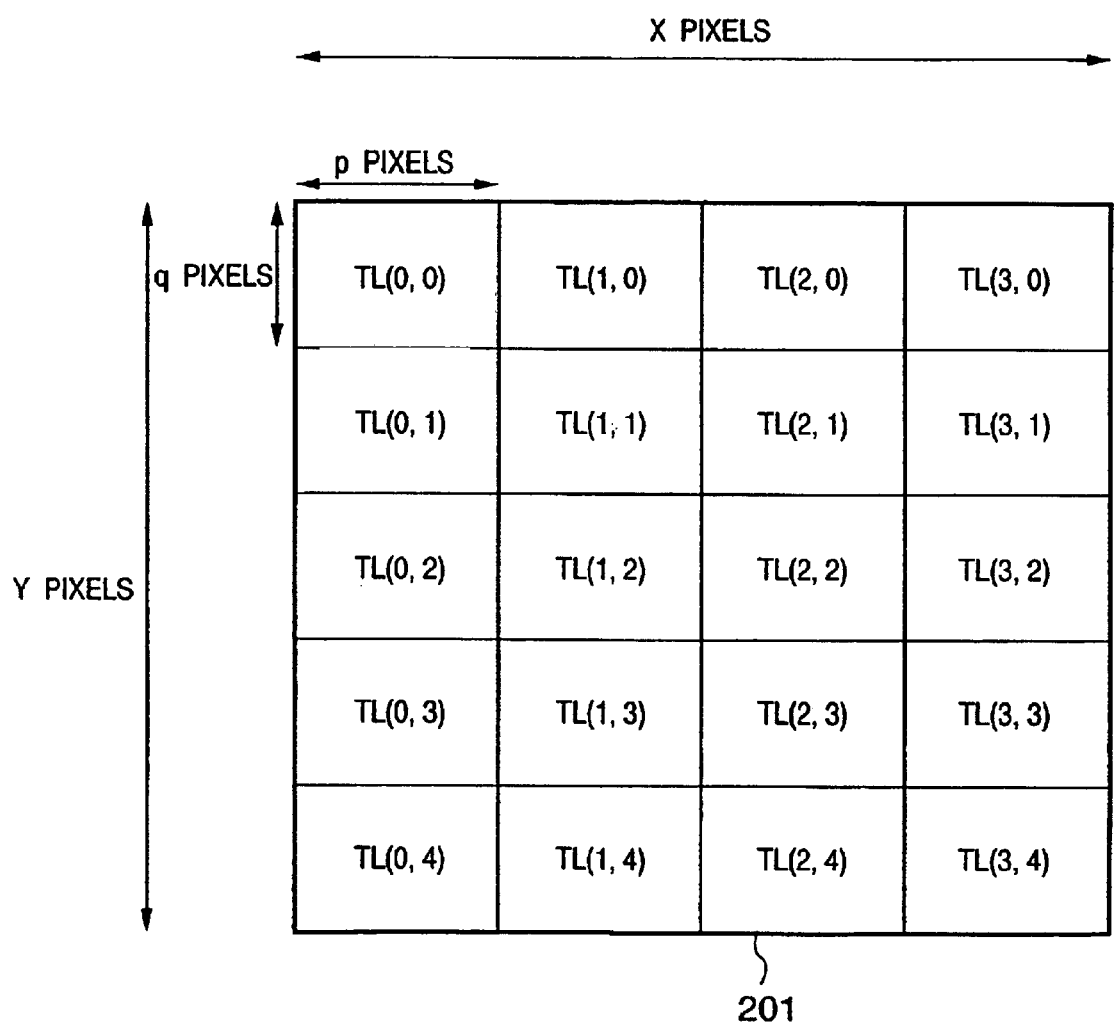
FIG. 2 is a view for explaining the operation for segmenting a first image into tile areas in the first embodiment of the present invention.

FIG. 2 shows the first image segmented into M×N tiles, and exemplifies a case wherein the first image is segmented into 5×4 tiles. In FIG. 2, X and Y respectively represent the numbers of horizontal and vertical pixels of the first image 201.

Also, p and q respectively represent the numbers of horizontal and vertical pixels of each segmented tile upon segmenting the first image into the M×N rectangular tiles TL(0, 0), TL(1, 0), TL(2, 0), . . . , TL(2, 4), and TL(3, 4).

Hence, X=p×M and Y=q×N.

Figure 3:
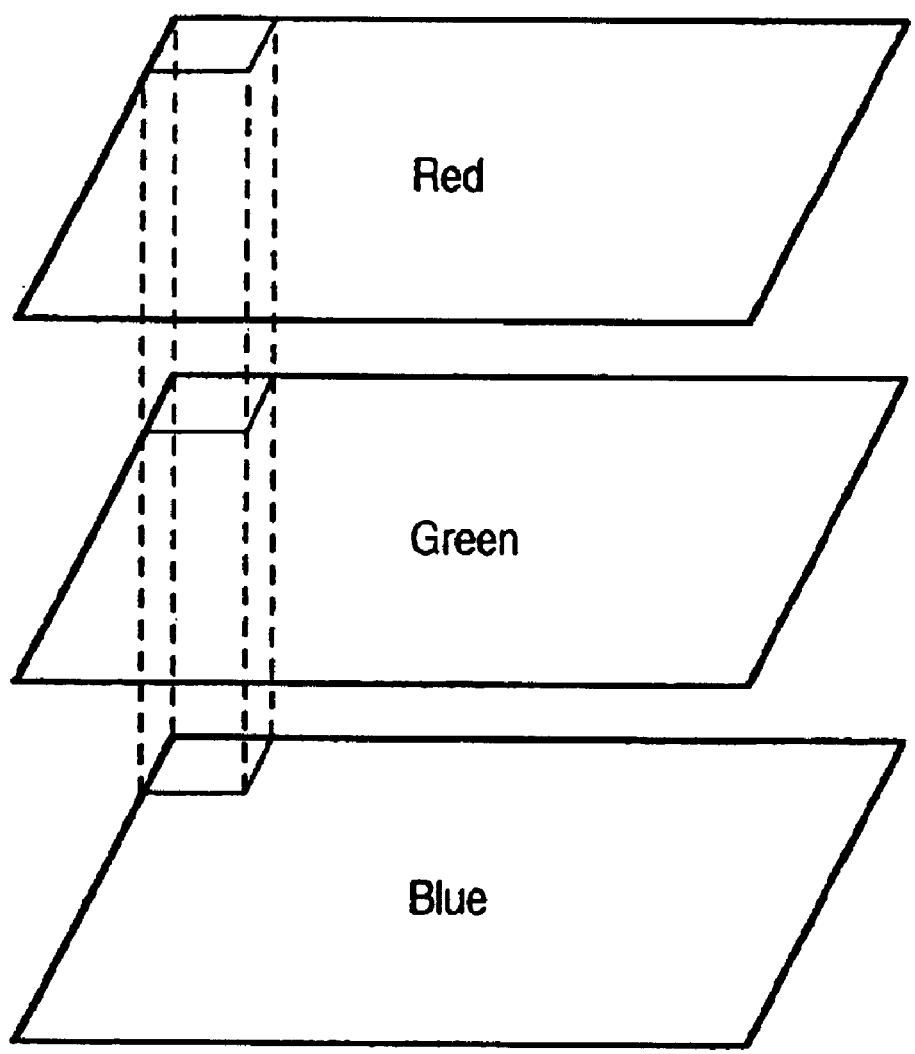
FIG. 3 is a view for explaining the format of each tile in the first embodiment of the present invention.

FIG. 3 shows the format of each tile. Each tile is decomposed into p×q pixel planes of three primary colors, i.e., red (R), green (G), and blue (B).

Subsequently, in step S301 in FIG. 4, the R, G, and B average density values of each of the M×N tiles segmented in step S300 are computed by:

$$Rd\_av = 1/p*q \cdot \Sigma Ri$$

$$Gd\_av = 1/p*q \cdot \Sigma Gi$$

$$Bd\_av = 1/p*q \cdot \Sigma Bi$$

Note that "d" is an abbreviation for "destination".

In step S302, "0" is set in counter i to initialize it. It is then checked in step S303 if a source image is a moving image (an image including a plurality of still images). If a source image is not a moving image but a still image, the flow advances to step S305 to compute the R, G, and B average density values of each image by:

$$Rs\_av = 1/p*q \cdot \Sigma Ri$$

$$Gs\_av = 1/p*q \cdot \Sigma Gi$$

$$Bs\_av = 1/p*q \cdot \Sigma Bi$$

Note that "s" is an abbreviation for "source". The flow then advances to step S306.

Figure 5:
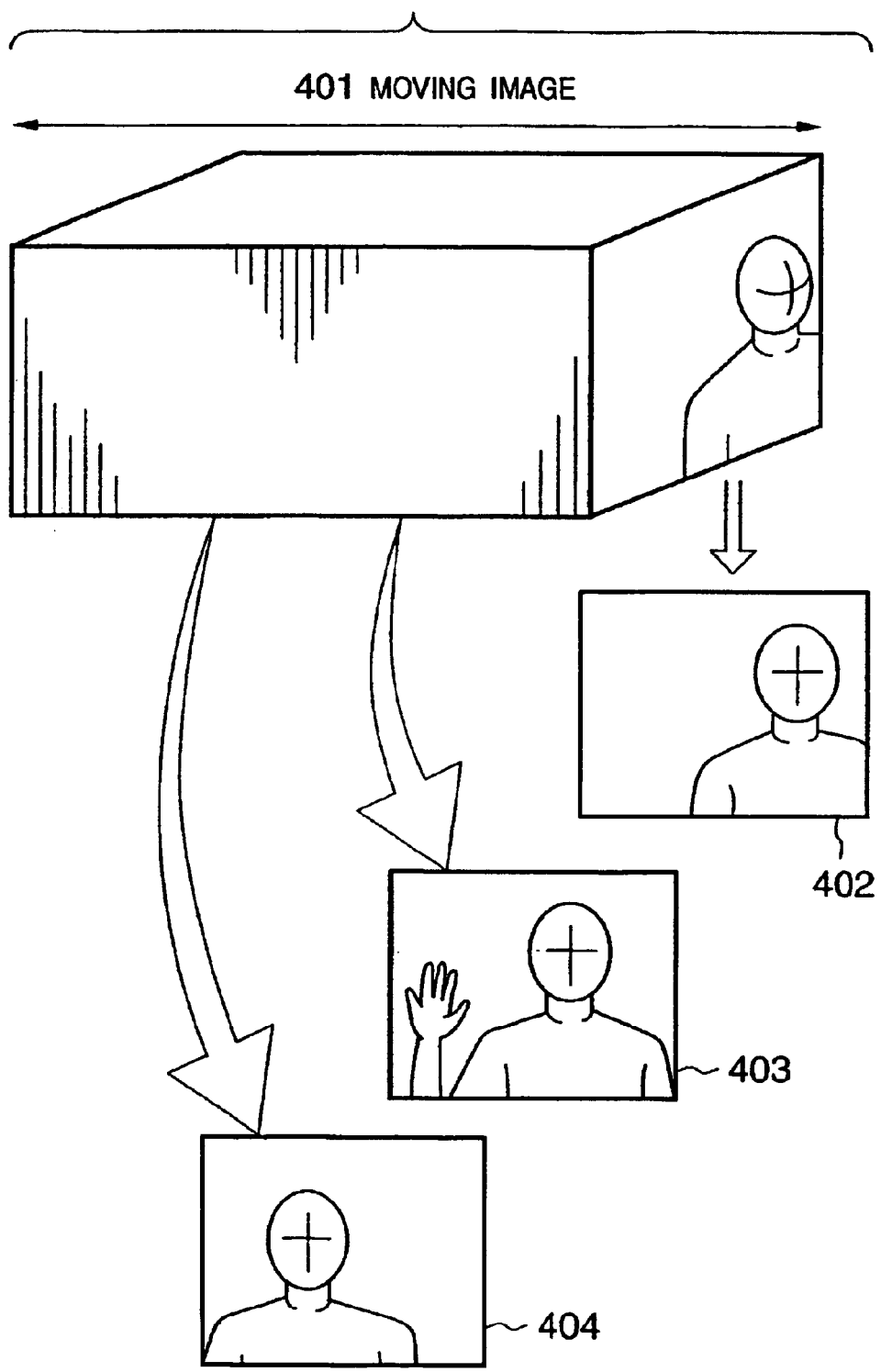
FIG. 5 is a view for explaining a method of computing the average density from a moving image in the first embodiment of the present invention.

On the other hand, if it is determined in step S303 that the source image is a moving image, the flow advances to step S304, and the average density values are computed after the moving image is converted into still images. FIG. 5 depicts an outline of the process in step S304. As shown in FIG. 5, a moving image 401 is sampled at unit time intervals to extract still images 402, 403, and 404 therefrom. The average density values of the respective extracted images are computed, and the average density values of the moving image are then computed based on the average density values. The method of computing the average density value is the same as that in step S305. Therefore, when the source image is a moving image, the average density values of the moving image can be computed from still images that form the moving image. The flow then advances to step S306. Note that details of the process in step S304 will be described later.

After the average density values are computed, counter i is incremented by 1 in step S306. It is then checked in step S307 if counter i≧P, i.e., if the average density values have been computed for all P source images. If NO in step S307, the flow returns to step S303 to repeat the aforementioned operations until the average density values are computed for all P source images.

In this way, when a source image has a moving image, the moving image can be used as a source image by extracting still images from the moving image and computing their average density values.

If it is determined in step S307 that the average density values have been computed for all the source images, the flow advances to step S308 to reset counters X_Pos (0≦X_Pos≦M−1) and Y_Pos (≦Y_Pos≦N−1) indicating the position of a tile of interest to zero, so as to set the start position at the upper left tile area of the first image. Note that (X_Pos, Y_Pos)=(0, 0) indicates the upper left tile position of the first image.

In step S309, an image most suitable for a tile indicated by the position counters (X_Pos, Y_Pos) is selected from the source images. In the selection method, distances ΔE of R, G, and B three stimulus values are computed, and an image with the smallest distance ΔE is selected.

An evaluation formula upon selection is:

$$\Delta E=(Rs\_av-Rd\_av)^2+(Gs\_av-Gd\_av)2+(Bs\_av-Bd\_av)^2$$

In this manner, a source image having density values closest to the average density values of a tile can be selected.

In step S310, if the selected image is a still image, its image data is pasted onto the tile area. On the other hand, if the selected image is a moving image, control is made to repetitively play back that moving image at the position of the tile area. Upon pasting the selected still image or moving image, if its size does not match that of the tile area, the source image undergoes enlargement/reduction to have an appropriate size.

In step S311, the processing position is shifted to the right. In this case, if the processing position has reached the right end, it is shifted downward to the left end of the next tile area array. It is then checked in step S312 if no next processing position remains in the shift process in step S311, i.e., if the processes are complete for all the tiles. If the next processing time position remains, the flow returns to step S309 to execute the source image paste process to the next tile position.

On the other hand, if it is determined in step S312 that the paste process has been successively done in the horizontal and vertical directions, and processes for all tiles are complete, this processing ends.

Figure 6:
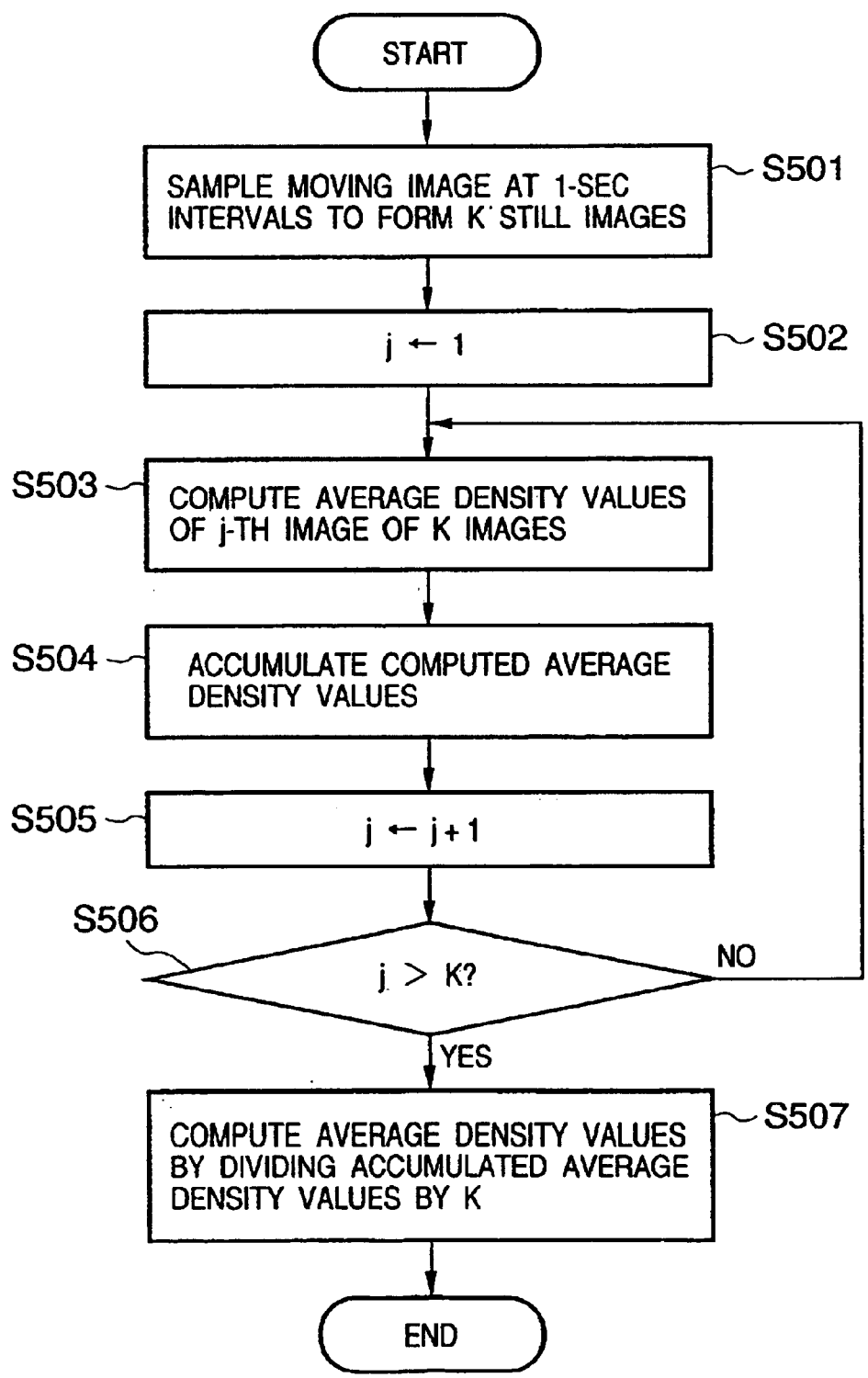
FIG. 6 is a flow chart showing details of a process for computing the average density of a moving image in the first embodiment of the present invention.

Details of the process for computing the average density values of a moving image in step S304 will be described below with reference to FIG. 6. FIG. 6 is a flow chart showing details of the process for computing the average density values of a moving image in this embodiment.

In step S501, a moving image is sampled at predetermined periods, e.g., at 1-sec intervals to extract K still images. In step S502, counter j is initialized to "1" to compute average densities for all the K still images.

In step S503, the R, G, and B average density values of the j-th still image of the K still images are computed by:

$$R\_av=1/p*q\cdot\Sigma Rj$$

$$G\_av=1/p*q\cdot\Sigma Gj$$

$$B\_av=1/p*q\cdot\Sigma Bj$$

In step S504, the average density values computed in step S503 are accumulated by:

$$Rs\_Sum=Rs\_Sum+R\_av$$

$$Gs\_Sum=Gs\_Sum+G\_av$$

$$Bs\_Sum=Bs\_Sum+B\_av$$

After the average density values are accumulated, the flow advances to step S505 to increment counter j by 1. It is checked in step S506 if counter j≧K, i.e., if the average density values of all the K still images have been computed. If NO in step S506, the flow returns to step S503 to repeat the aforementioned operations until the average density values are computed for all the still images.

Upon completion of computations of the average density values for all the K still images, the flow advances from step S506 to step S607 to compute the R, G, and B average density values of the K still images by:

$$Rs\_av=Rs\_Sum/K$$

$$Gs\_av=Gs\_Sum/K$$

$$Bs\_av=Bs\_Sum/K$$

In this manner, the average density values of the moving image used as a source image can be obtained.

Note that a moving image used as a source image is prepared by extracting it from a predetermined moving image. In order to generate a mosaic image with high precision, a moving image in which similar images successively appear, i.e., which includes no scene change, is required.

As described above, the average density values of the moving image are obtained by extracting K still images by sampling the moving image at predetermined periods, and averaging the average density values of the extracted K still images. If the extracted moving image includes a scene change, still images sampled before and after the scene change become different, and dissimilar to each other, and their average density values have large differences. In this case, the average density values of the moving image become considerably different from those of a given tile area of a mosaic image.

As a result, that tile area which forms the mosaic image appears unnatural, and a mosaic image with high precision cannot be generated. Therefore, a moving image including no scene change must be used as a source image. An example of a method of extracting a moving image including no scene change from a predetermined moving image will be explained below.

Differences between pixels at identical positions of two neighboring frames of a moving image are detected. If a value obtained by adding up this difference for one frame is larger than a predetermined threshold value, it is determined that a scene change is present between these two neighboring frames. Thus, the moving image is segmented between these two neighboring frames, and a moving image free from any scene change can be obtained. When this process is done for all frames that form a moving image, a plurality of sets of moving images can be extracted.

As described above, the first embodiment can provide an image processing apparatus and method, which can generate a mosaic image when the image to be processed and source images are still image, can also generate a mosaic image by computing the average density values of a moving image when the image to be processed and source images have moving image data, and can directly use a moving image as a source image of a mosaic image.

As described above, according to the present invention, a mosaic image can be generated by mosaicking using either still images or moving images for some or all tiles.

[Second Embodiment]

The basic arrangement of the second embodiment is the same as that in the first embodiment shown in FIG. 1, and a detailed description thereof will be omitted. An image composition method based on mosaicking according to the second embodiment will be described below with reference to FIGS. 8 to 11.

Figure 8:
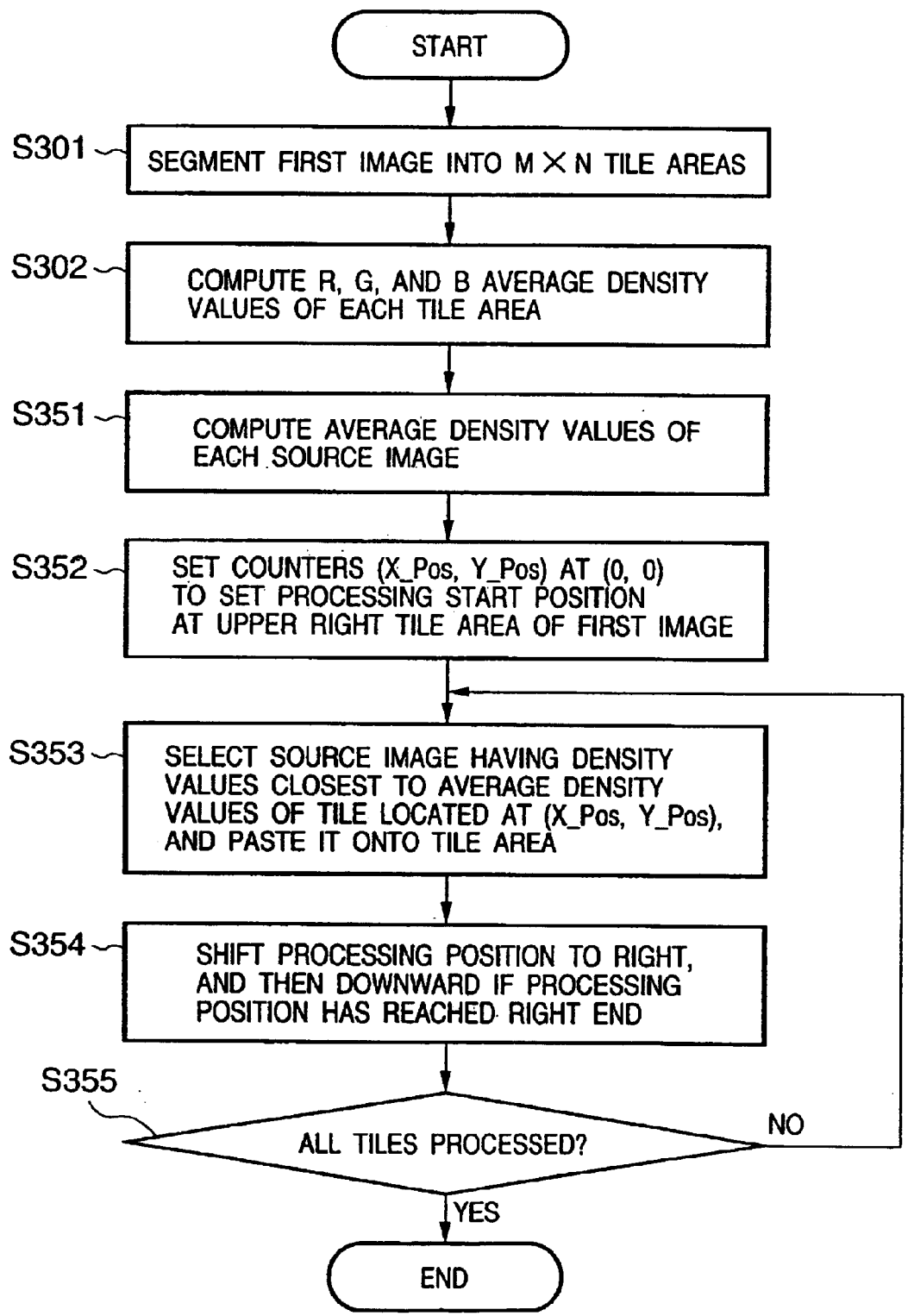
FIG. 8 is a flow chart showing a mosaic image generation process according to the second embodiment of the present invention.

An operation for generating a mosaic image in the mosaic image generator in the second embodiment will be explained below with reference to the flow chart in FIG. 8. FIG. 8 is a flow chart showing a mosaic image generation method of the second embodiment.

The same step numbers in FIG. 8 denote the same processes as those of the first embodiment shown in FIG. 4, and a detailed description thereof will be omitted.

In step S301, the first image is segmented into M×N first tiles, as shown in, e.g., FIG. 2. As a result, M×N rectangular tiles TL(0, 0), TL(1, 0), TL(2, 0), . . . , TL(2, 4), and TL(3, 4) are generated.

Each tile format is as shown in FIG. 3, as described in the first embodiment.

In step S302 in FIG. 8, R, G, and B average density values of each of the M×N tiles segmented in step S301 are computed in the same manner as in the first embodiment.

In step S351, the R, G, and B average density values of each source image are computed by:

$Rs\_av = 1/p \times q \cdot \Sigma Ri$ $Gs\_av = 1/p \times q \cdot \Sigma Gi$ $Bs\_av = 1/p \times q \cdot \Sigma Bi$ Note that "s" is an abbreviation for "source".

Upon completion of computations of the R, G, and B average density values of respective source images, the flow advances to step S352 to reset counters X_Pos ($0 \leq X\_Pos \leq M-1$) and Y_Pos ($0 \leq Y\_Pos \leq N-1$) indicating the position of a tile of interest to zero, so as to set the start position at the upper left tile area of the first image. Note that (X Pos, Y Pos)=(0, 0) indicates the upper left tile position of the first image.

In step S353, an image most suitable for a tile indicated by the position counters (X_Pos, Y_Pos) is selected from the source images. In the selection method, distances ΔE of R, G, and B three stimulus values are computed, and an image with the smallest distance ΔE is selected.

An evaluation formula upon selection is:

$\Delta E = (Rs\_av - Rd\_av)^2 + (Gs\_av - Gd\_av)^2 + (Bs\_av - Bd\_av)^2$

In this manner, a source image having density values closest to the average density values of a tile can be selected.

Subsequently, in step S354 the processing position is shifted to the right. In this case, if the processing position has reached the right end, it is shifted downward to the left end of the next tile area array. It is then checked in step S355 if no next processing position remains in the shift process in step S354, i.e., if the processes are complete for all the tiles. If the next processing time position remains, the flow returns to step S353 to execute the source image paste process to the next tile position.

On the other hand, if it is determined in step S355 that the paste process has been successively done in the horizontal and vertical directions, and processes for all tiles are complete, this processing ends. As a result of the aforementioned processes, a mosaic image is generated.

Figure 9:
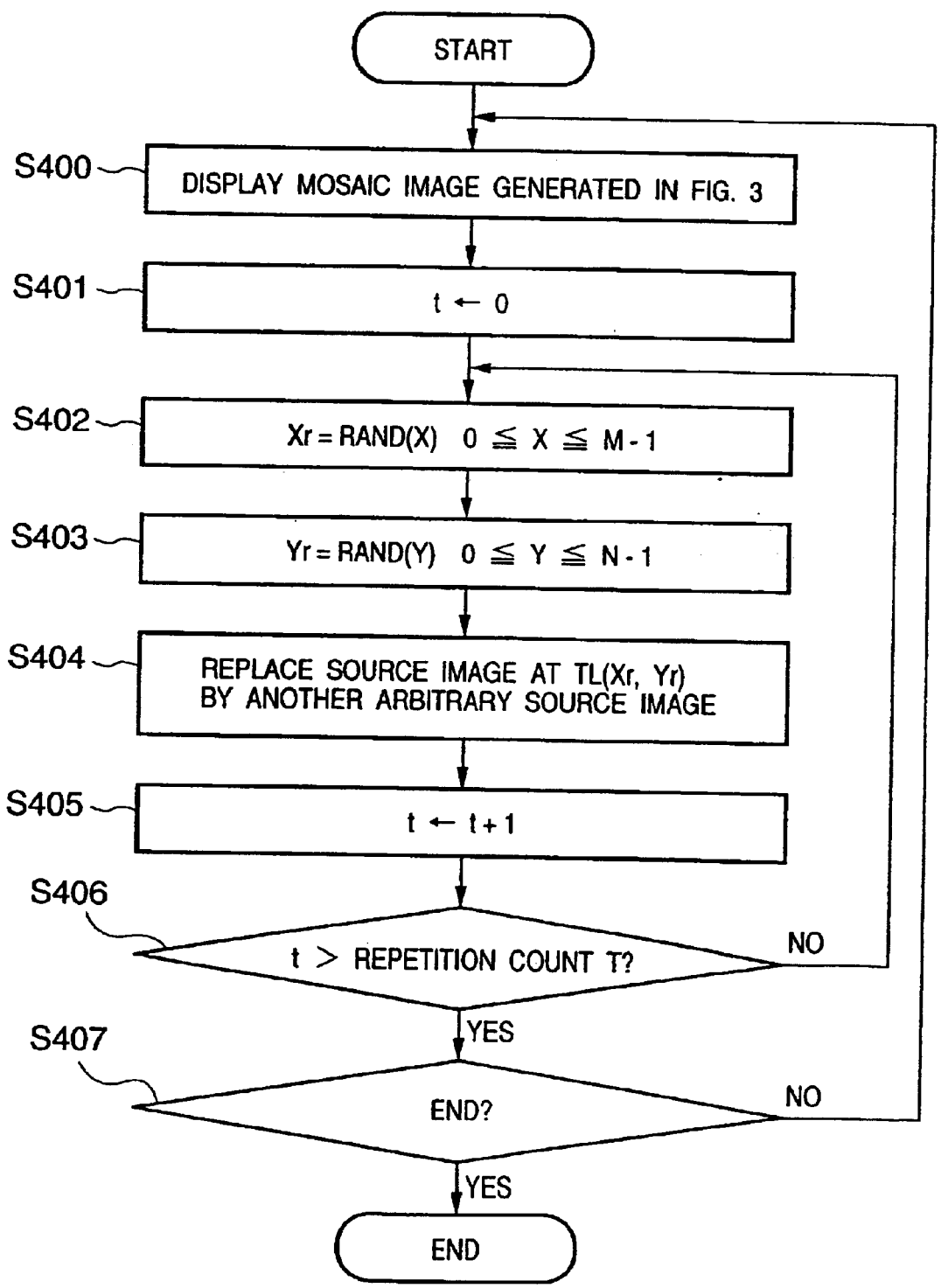
FIG. 9 is a flow chart showing display control of a mosaic image in the second embodiment.

A process for displaying a mosaic image generated in this manner in the second embodiment will be explained below with reference to FIG. 9. FIG. 9 is a flow chart showing the display control of a mosaic image in the second embodiment.

In the display control of a mosaic image in the second embodiment, a mosaic image generated under the control shown in FIG. 8 is displayed on the display unit 102 in step S400 in FIG. 9.

In step S401, counter t is reset to "0". In step S402, a random number ranging from 0 to (M−1) is generated to determine a source image position to be switched in the X-direction, and the generated value is determined to be an X-coordinate Xr.

In step S403, a random number ranging from 0 to (N−1) is generated to determine a source image position to be switched in the Y-direction, and the generated value is determined to be a Y-coordinate Yr. In step S404, an image located at a position TL(Xr, Yr) is replaced by another source image.

In step S405, counter t is incremented by 1. It is then checked in step S406 if counter t is larger than repetition count T. If t<T, the flow returns to step S402.

On the other hand, if t≧T in step S406, the flow advances to step S407. It is checked in step S407 if the processing is to end. If NO in step S407, the flow returns to step S400; otherwise, the processing ends.

As described above, according to the second embodiment, the source image on each tile changes constantly, and a mosaic image can be displayed after a predetermined number of source images are switched and displayed.

[Third Embodiment]

In the second embodiment described above, a source image on each tile is replaced by another randomly selected source image. However, the tile processing method is not limited to such specific method, and an image to be displayed on each tile may be determined as in the third embodiment to be described below.

Since the arrangement of a mosaic image generator of the third embodiment is the same as that in the first and second embodiments shown in FIG. 1, a detailed description thereof will be omitted, and only differences from the first and second embodiments will be explained below.

Figure 10:
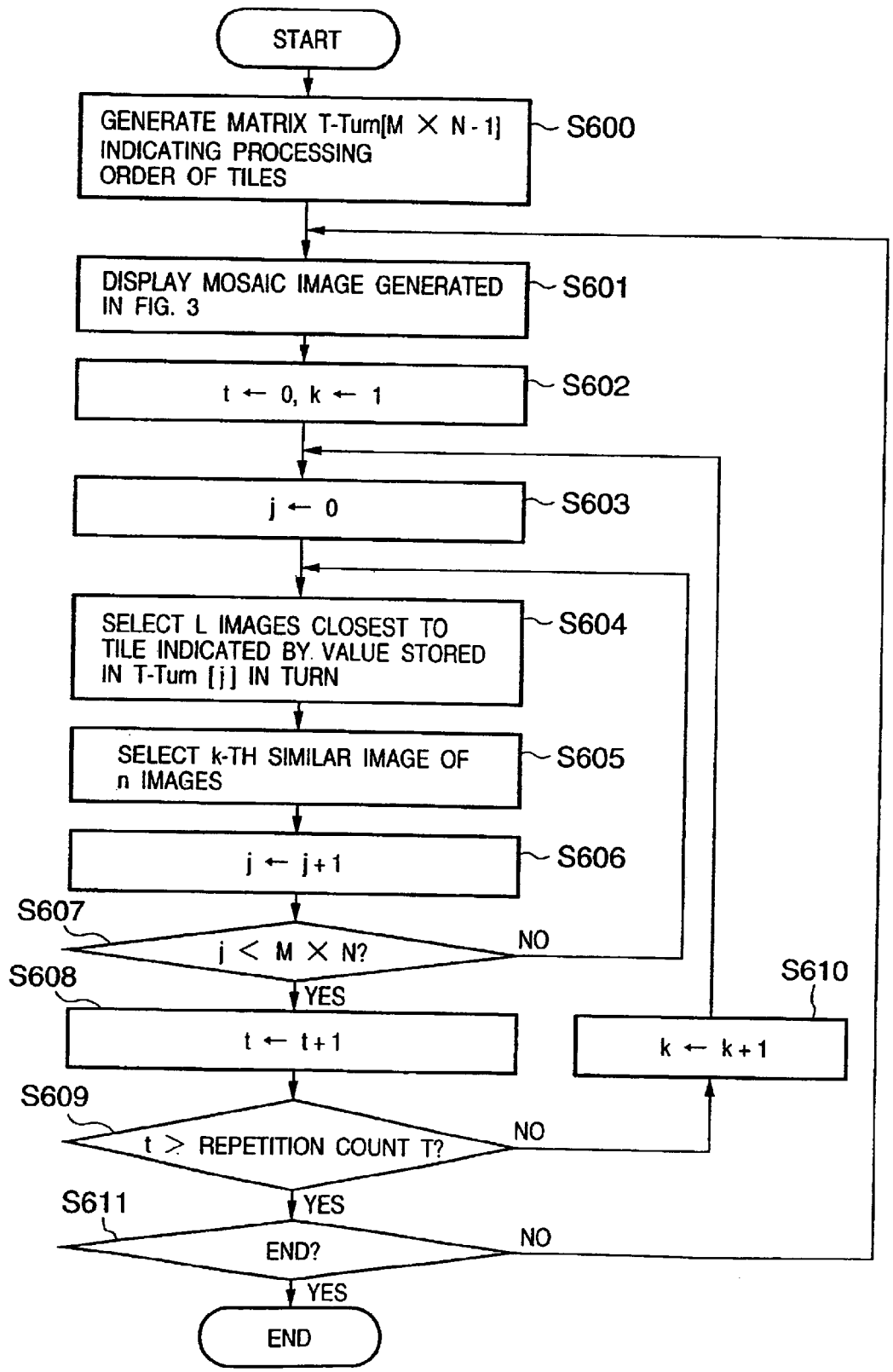
FIG. 10 is a flow chart showing display control of a mosaic image according to the third embodiment of the present invention.

FIG. 10 is a flow chart showing a mosaic image generation method according to the third embodiment of the present invention.

In the third embodiment, in step S600 in FIG. 10, a tile processing order is stored in a matrix T-Turn[M×N−1] indicating the tile processing order.

Figure 11:
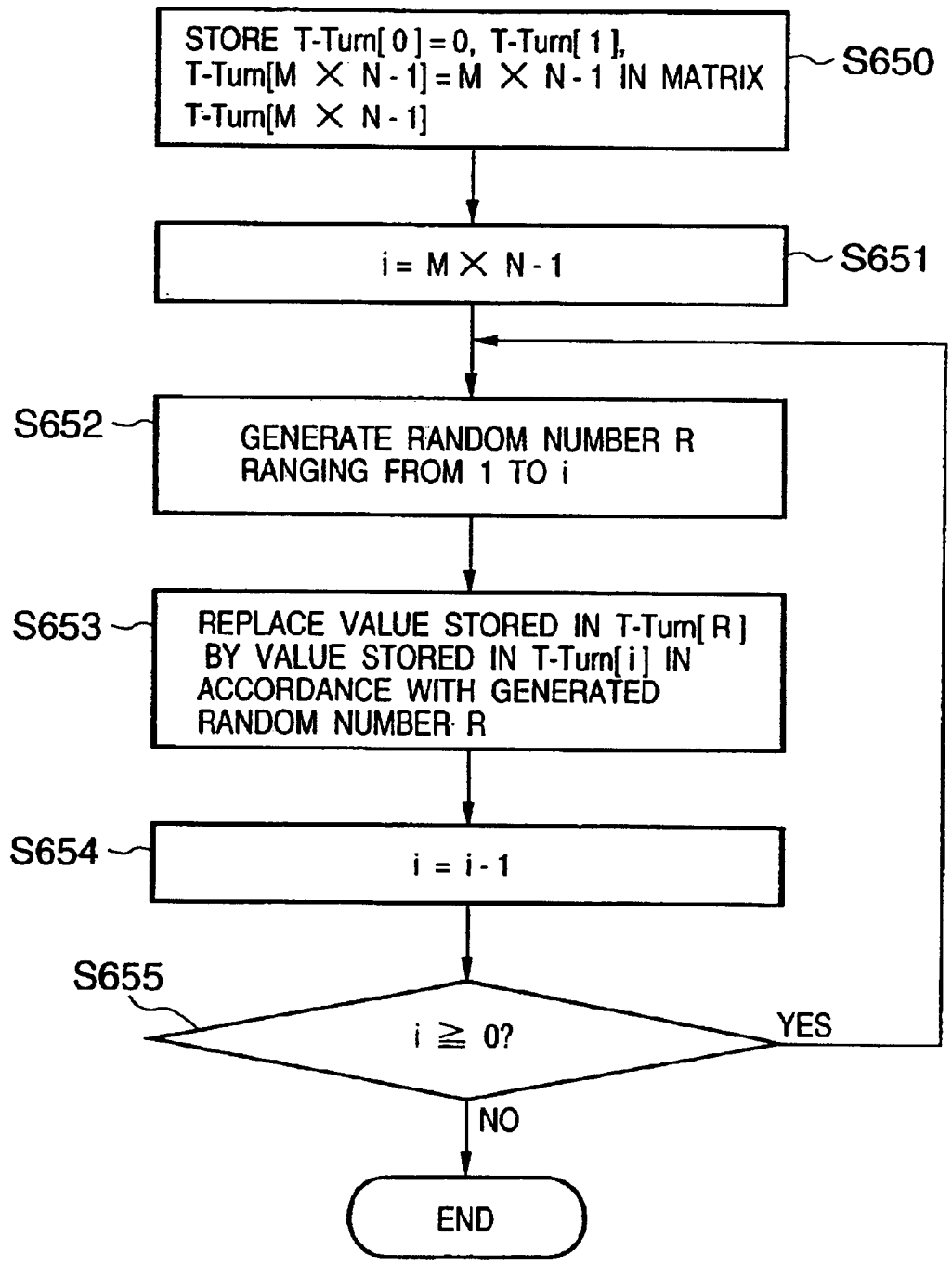
FIG. 11 is a flow chart showing a sequence for randomly storing (M×N−1) images in a matrix T-Turn[M×N−1] of the third embodiment.

FIG. 11 shows details of the process for storing the processing order in the matrix T-Turn[M×N−1] in step S600. FIG. 11 is a flow chart showing details of the process for storing the processing order in the matrix T-Turn[M×N−1].

More specifically, (M×N−1) images are randomly stored in the matrix T-Turn[M×N−1].

Referring to FIG. 11, T-Turn[0]=0, T-Turn[1]=1, T-Turn[2]=2, . . . , T-Turn[M×N−1]=M×N−1 are temporarily stored in the matrix T-Turn[M×N−1] indicating the tile processing order in step S650.

In step S651, "M×N−1" is set in counter i. In step S652, a random number R ranging from 1 to i is generated. In step S653, the values stored in T-Turn[R] and T-Turn[i] are replaced with each other in accordance with the generated random number R.

In step S654, counter i is decremented by 1, i.e., i=(i−1). It is checked in step S655 if counter value i≧0. If counter value i assumes a positive value, i.e., i≧0, the flow returns to step S652 to repeat the aforementioned operations. On the other hand, if counter value i assumes a negative value, this processing ends.

In this manner, the matrix T-Turn[M×N−1] indicating a random tile processing order is generated.

Referring back to the description of the processing shown in FIG. 10, upon completion of the process in step S600, the flow advances to step S601 to display a mosaic image generated by the processing shown in the flow chart in FIG. 8.

In step S602, counter t is initialized to "0", and similarity order k is initialized to "1". Subsequently, counter j is initialized to "0" in step S603.

In step S604, n images (1<n< the total of source images) are selected from the source images in the order of those having average density values closer to a tile indicated by a value stored in T-Turn[j]. In step S605, the k-th similar image to the selected tile replaces the current source image.

In step S606, counter j is incremented by 1. It is checked in step S607 if counter value j<M×N. If YES in step S607, the flow returns to step S604.

On the other hand, if j≧M×N in step S607, the flow advances to step S608 to increment counter t by 1. It is checked in step S609 if counter value t>repetition count T. If NO in step S609, the flow advances to step S610 to increment similarity order k by 1 (k=k+1), and the flow returns to step S604 to reset counter j to "0".

If counter value t>repetition count T in step S609, the flow advances to step S611. It is checked in step S611 if an instruction for ending this processing is input. If NO in step S611, the flow returns to step S601 to repeat the aforementioned processes.

On the other hand, if this processing is to end in step S611, the processing shown in the flow chart in FIG. 10 ends.

By repeating the aforementioned processing shown in FIG. 10, the source image on each tile repetitively changes in turn from a similar one to a non-similar one several times, and a mosaic image with the best image quality is finally displayed again.

As described above, according to the third embodiment, upon displaying a mosaic image, the mosaic image as a whole gradually changes from the one with higher image quality to the one with lower image quality, and the user can see a large number of source images during that interval.

According to the second and third embodiments described above, an image processing apparatus and method, which allow the user to confirm many source images by, e.g., displaying remaining source images after a mosaic image is generated can be provided.

When an image is generated by mosaicking, mosaic images can be displayed at given time intervals using many source images.

Furthermore, upon displaying a mosaic image, the mosaic image as a whole gradually changes from the one with higher image quality to the one with lower image quality, and the user can see a large number of source images during that interval.

[Fourth Embodiment]

Figure 12:
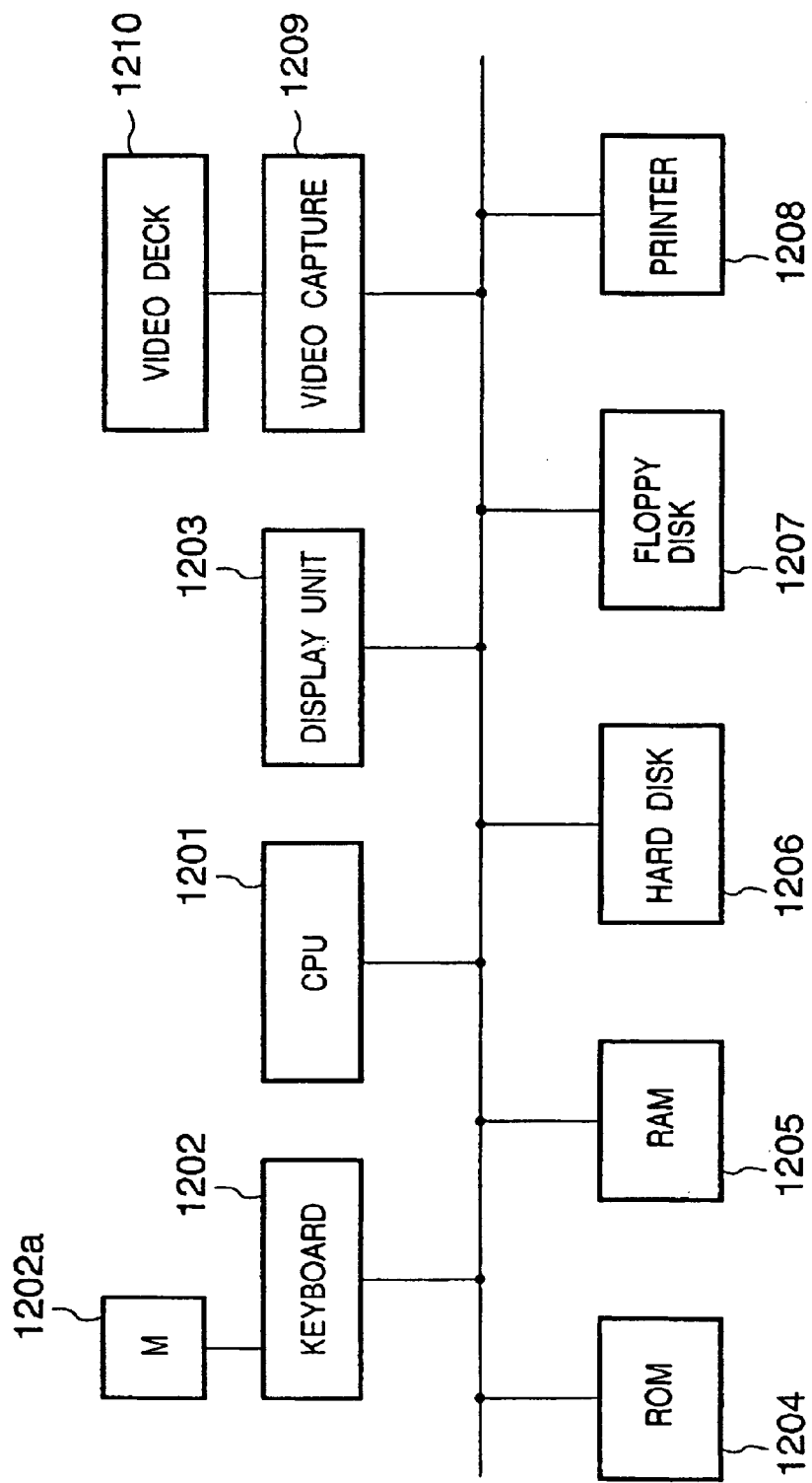
FIG. 12 is a block diagram showing the arrangement of a computer system that implements an image process according to the fourth embodiment of the present invention.

The fourth embodiment of the present invention will be described below with reference to FIG. 12. FIG. 12 is a block diagram showing the arrangement of a computer system that implements an image process according to the fourth embodiment of the present invention.

Referring to FIG. 12, reference numeral 1201 denotes a CPU for controlling the entire system of this embodiment; and 1202, a keyboard which comprises a mouse 1202a and is used to make various instruction inputs. Reference numeral 1203 denotes a display device which can comprise, e.g., a CRT, liquid crystal display, or the like. Reference numeral 1204 denotes a ROM; and 1205, a RAM, which constructs a storage device of the system and stores programs executed by the system, data used by the system, and the like.

Reference numeral 1206 denotes a hard disk device; and 1207, a floppy disk device, which constructs an external storage device used by a file system of the system. Reference numeral 1208 denotes a printer. Reference numeral 1209 denotes a video capture device which can digitize a moving image signal sent from a video deck 1210, and can capture it into the computer system. Note that the component 1210 is not limited to a video deck as long as it can output a moving image signal, and can be an LD player, DVD player, video camera, TV tuner, or the like.

Figure 13:
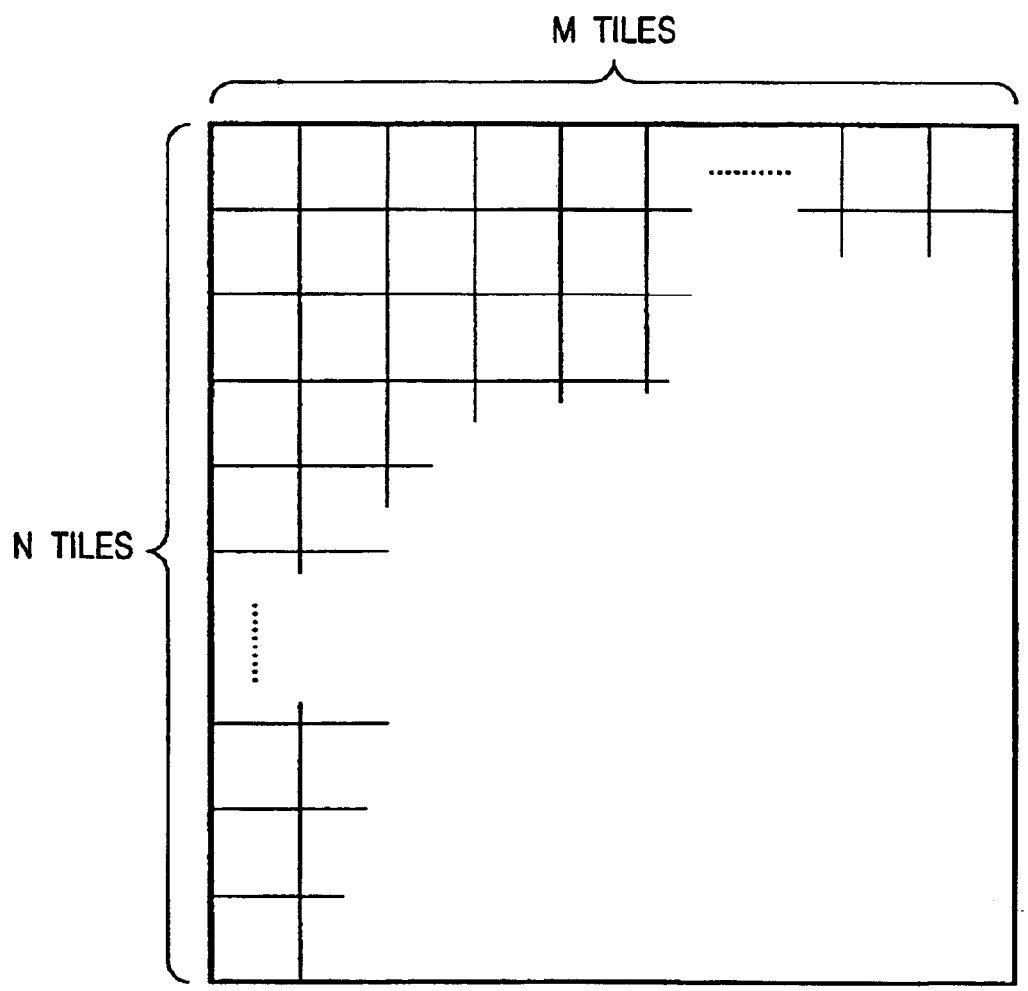
FIG. 13 is a view for explaining an example of the format of a mosaic image in the fourth embodiment.

The hard disk device 1206 stores a plurality of (e.g., P) tile images serving as building components of a mosaic image, and the fourth embodiment generates a mosaic image by combining M×N images selected from those tile images by arranging M images in the horizontal direction and N images in the vertical direction, as shown in FIG. 13. The generated mosaic image is stored as an image file in the hard disk device 1206, and is displayed on the display device 1203 or is output to and printed out by the printer 1208.

The mosaic image generation method in the fourth embodiment with the aforementioned arrangement is the same as that shown in FIG. 7 of the first embodiment mentioned above. Therefore, a detailed description thereof will be omitted.

Figure 14:
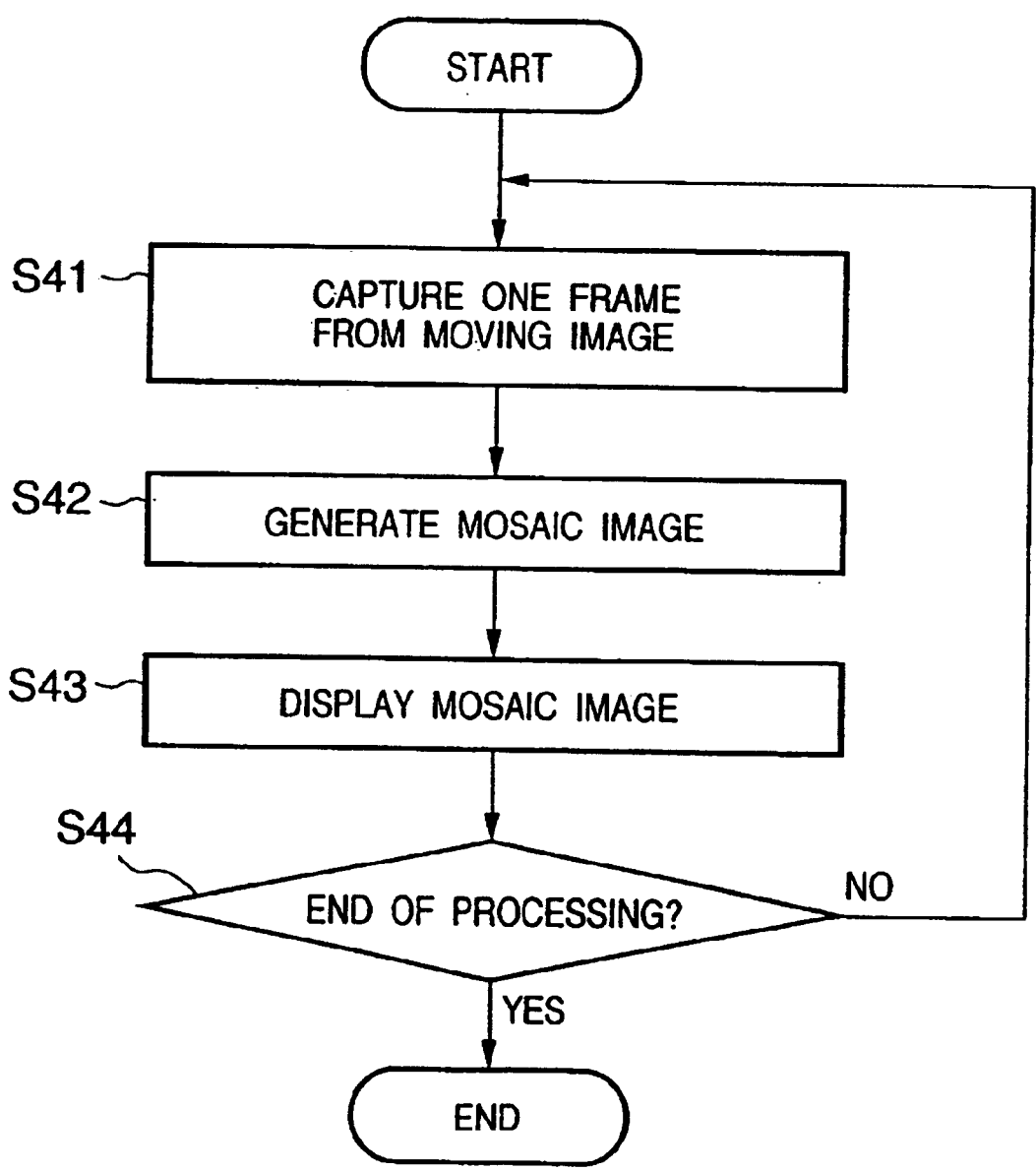
FIG. 14 is a flow chart for explaining a moving mosaic image generation process in the computer system of the fourth embodiment.

A moving mosaic image generation method of the fourth embodiment will be described below with reference to FIG. 14. FIG. 14 is a flow chart showing an outline of the processing flow of the moving mosaic image generation method in the computer system of the fourth embodiment. The following processing is mainly done under the control of the CPU 1201.

In the fourth embodiment, upon generating a moving mosaic image, one frame of a moving image is captured by the video capture device 1209 in step S41 to obtain a first image 201 shown in FIG. 7. In step S42, the captured first image 201 is analyzed, and appropriate images are selected from source images and are synthesized to obtain a second image 202. The synthesis process will be described in detail later.

In step S43, the second image 202 is displayed on the display device 1203. It is then checked in step S44 if the processing is to end. If the processing is to continue, the flow returns to step S41 to repeat the aforementioned processes (e.g., the next frame of the moving image is captured by the video capture device 1209 to obtain an image 201, and so forth).

On the other hand, if it is determined in step S44 that the processing is to end, the processing for generating the moving mosaic image ends. The end of processing is determined depending on whether or not an end instruction is input by the user, a predetermined number of frames have been processed, and so forth. Note that "frames" in the description of this embodiment means still images that form a moving picture, and read "fields" in case of a format that makes field recording such as NTSC or the like.

Figure 15:
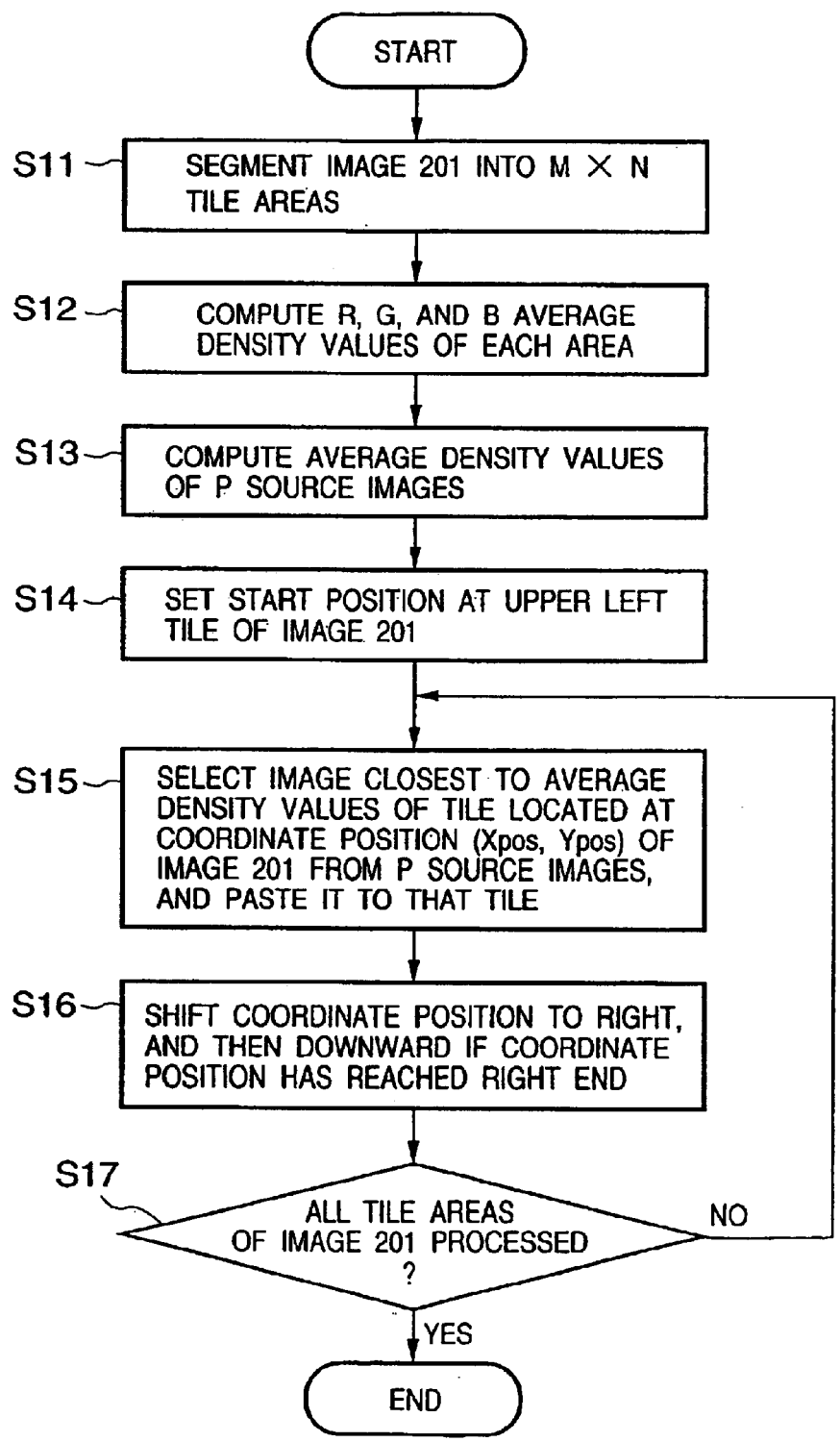
FIG. 15 is a flow chart showing an automatic generation process of a mosaic image in the fourth embodiment.

Details of the mosaic image automatic generation process in step S41 above will be explained below with reference to FIG. 15. FIG. 15 is a flow chart for explaining details of the synthesis process in step S41 in FIG. 14 in the fourth embodiment, i.e., showing the flow of the processes for selecting appropriate source images and synthesizing them to obtain a mosaic image.

Figure 16:
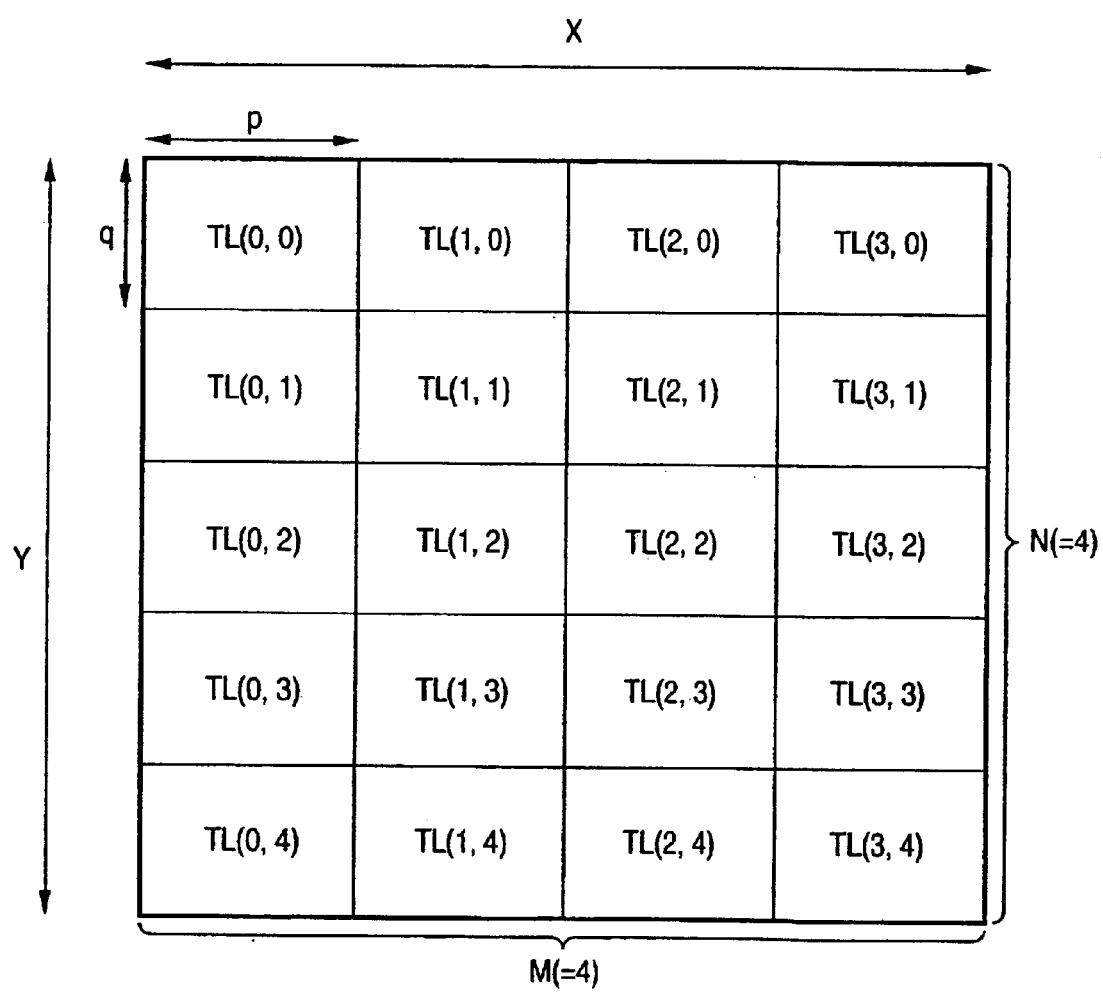
FIG. 16 is a view for explaining an example of an original image segmented into areas in the fourth embodiment.

In step S11, a first image 201 is segmented into M×N areas (tiles). As a result of segmentation, the first image is broken up into M×N rectangular tiles TL(0, 0), TL(1, 0), TL(2, 0), . . . , TL(2, 4), and TL(3, 4), as shown in FIG. 16. FIG. 16 is a view for explaining an example of an image segmented into areas according to the fourth embodiment.

Referring to FIG. 16, X and Y respectively represent the numbers of horizontal and vertical pixels of the image 201. Also, p and q respectively represent the numbers of horizontal and vertical pixels of each segmented tile. Hence, X=p×M and Y=q×N. In this case, all tile sizes are equal to each other for the sake of simplicity. However, the fourth embodiment is not limited to this, and the same control can apply even when tiles have arbitrary sizes and shapes. In such case, enlargement/reduction may be done as needed.

In the fourth embodiment as well, the color configuration of each tile that form a mosaic image is the same as that in the first embodiment shown in FIG. 3. That is, each tile is further decomposed into p×q image data of three primary colors, i.e., red (R), green (G), and blue (B).

Subsequently, in the process in step S12 in FIG. 15, the R, G, and B average density values of each of the M×N tiles segmented in step S11 are computed by:

$$Rd\text{-}av = \Sigma Ri/(p \times q)$$

$$Gd\text{-}av = \Sigma Gi/(p \times q)$$

$$Bd\text{-}av = \Sigma Bi/(p \times q)$$

Note that "d–av" means the average value of a destination (the first image 201 as an original image).

The flow then advances to step S13 to compute the R, G, and B average density values of each of P source images.

$$Rs\text{-}av = \Sigma Ri/(p \times q)$$

$$Gs\text{-}av = \Sigma Gi/(p \times q)$$

$$Bs\text{-}av = \Sigma Bi/(p \times q)$$

Note that "s–av" means the average value of a source (source; source image).

The flow advances to step S14 to reset counters Xpos (0≧Xpos ≦M−1) and Ypos (0≦Ypos≦N−1) indicating the position of a tile of interest to zero.
Note that (Xpos, Ypos)=(0, 0) indicates the upper left tile position of the first image 201.

The flow then advances to step S15 to select a source image most suitable for the tile indicated by the position counters Xpos and Ypos from the P source images. In this selection method, distances ΔE of R, G, and B tristimulus values are computed, and a source image with the smallest ΔE is selected. An evaluation formula used in this case is:

$$\Delta E = (Rs\text{-}av - Rd\text{-}av)^2 + (Gs\text{-}av - Gd\text{-}av)^2 + (Bs\text{-}av - Bd\text{-}av)^2$$

In step S16, the tile of interest of the image 201 is shifted to the next position. The flow then advances to step S17 to check if the processes are complete for all the tile areas of the image 201. If NO in step S17, the flow returns to step S15 to repeat the aforementioned processes until the processes are completed for all the tile areas of the image 201.

If it is determined in step S17 that the processes are complete for all the tile areas of the image 201, the synthesis process ends.

According to the fourth embodiment, a mosaic image can be generated using not only still images but also moving image data, and a moving mosaic image can be generated by simple processes.

[Fifth Embodiment]

In the fourth embodiment, a mosaic image is displayed while executing the mosaic image generation process at the same time. However, since the mosaic image generation process normally requires a heavy load, a long processing time is required in an inexpensive computer system, and it is hard to display a moving image in real time. In such case, when a moving mosaic image is displayed after the entire moving mosaic image is generated in advance, a computer system which does not have sufficiently high processing power can display a moving mosaic image. The fifth embodiment of the present invention that generates an entire moving mosaic image in advance, and then displays the moving mosaic image will be explained below.

Since the basic hardware arrangement of the fifth embodiment is the same as that shown in FIG. 12 of the fourth embodiment mentioned above, a detailed description thereof will be omitted.

Figure 17:
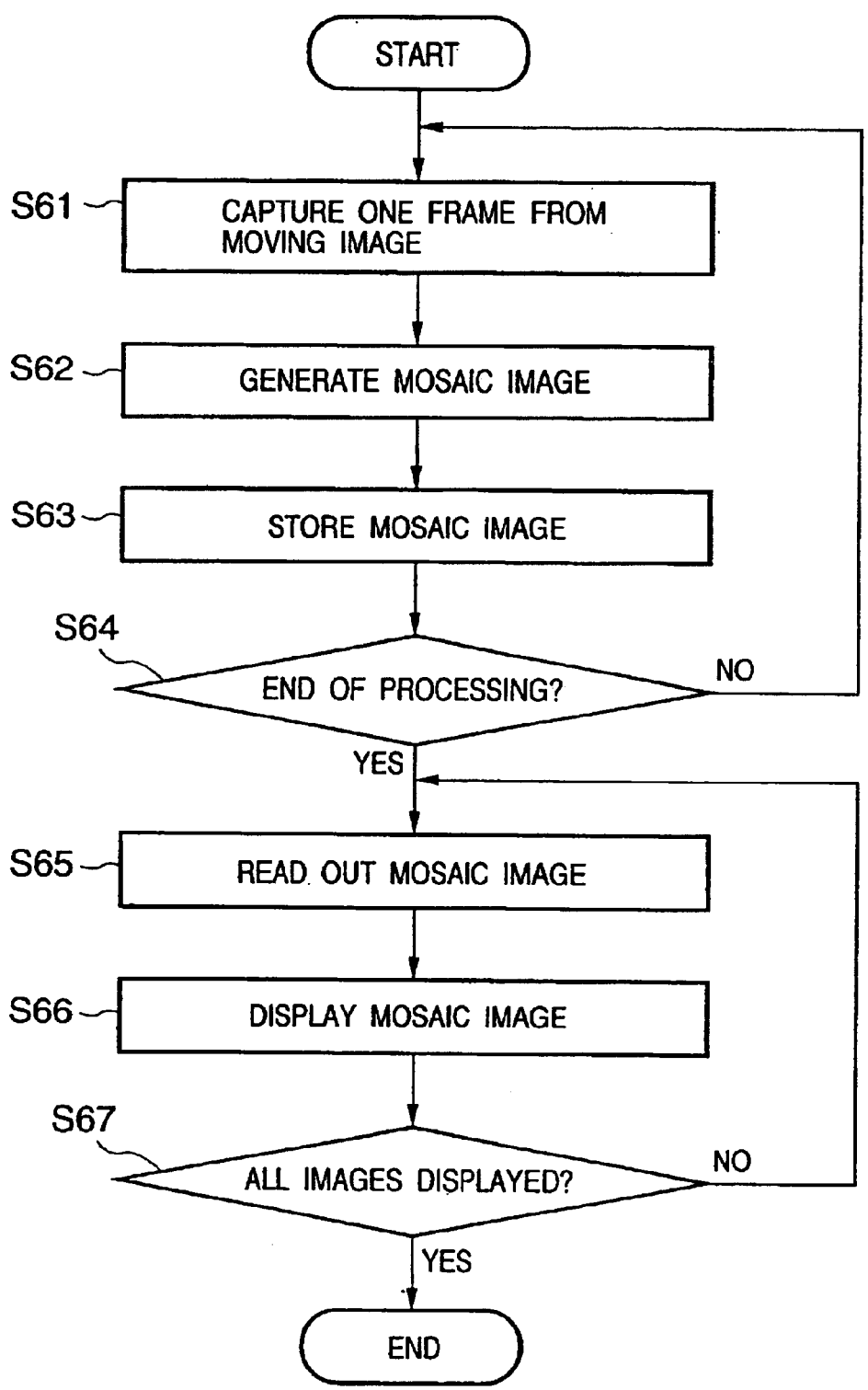
FIG. 17 is a flow chart for explaining a moving mosaic image generation process according to the fifth embodiment of the present invention.

Processes different from those in the fourth embodiment will be explained below with reference to FIG. 17. FIG. 17 is a flow chart for explaining a moving mosaic image generation process in the fifth embodiment of the present invention.

In step S61 in FIG. 17, one frame of a moving image is captured by the video capture device 209 as in step S41 to obtain an image 201. In step S62, the image 201 is analyzed, and appropriate images are selected from source images and are synthesized to obtain an image 202. Since details of this process are the same as those in step S42 in the fourth embodiment, a detailed description thereof will be omitted.

In the fifth embodiment, the second image 202 synthesized in step S63 is stored in one storage means of the RAM 205 and HDD 206. The storage location can be arbitrarily determined, and it is preferable to designate a storage means having a sufficient storage capacity. It is checked in step S64 if a mosaic image synthesis/storage process is to end. If the mosaic image synthesis/storage process is to continue, the flow returns to step 361.

On the other hand, if the mosaic image synthesis/storage process is to end, the flow advances to step S65. The end of the mosaic image synthesis/storage process can be arbitrarily determined depending on whether or not an end instruction is input by the user, a predetermined number of frames have been processed, and so forth.

In step S65, the mosaic image 202 stored in the predetermined storage means in step S63 is read out. In step S66, the image 202 is displayed on the display unit 203. It is checked in step S67 if all storage mosaic images have been displayed. If the synthesized mosaic images to be displayed remain in the storage means, the flow returns to step S65 to proceed with the process for reading out and displaying another mosaic image 202.

If it is determined in step S67 that no mosaic image to be displayed remains in the storage means, a series of synthesis/display processes end.

As described above, according to the fifth embodiment, even when the computer system has low image processing performance, a moving mosaic image can be generated and displayed.

[Modification of Fourth and Fifth Embodiments]

In the fourth and fifth embodiments described above, a moving image signal from a moving image signal output device such as a video deck or the like connected to the computer system is captured, and is converted into a moving mosaic image. However, the present invention is not limited to such specific arrangement. For example, a moving mosaic image may be generated based on a known MPEG or AVI moving image file pre-stored in the HDD 206, or a plurality of time-serial still image files may be used as source images.

In the fifth embodiment, individual mosaic images generated are independently stored. However, the present invention is not limited to such specific embodiment. For example, mosaic images may be recorded as different frames in a single moving image file, and the display process may simply play back that moving image file.

Furthermore, frames (still images) captured from a moving image which moves little (e.g., a moving image obtained by sensing a landscape, or a moving image without any scene change) become similar to each other.

When these frames undergo the mosaic image generation process, they use identical source images and similar mosaic images are generated. When these generated mosaic images are successively displayed, a motion-less moving mosaic image is generated.

In order to solve this problem, in the fourth and fifth embodiments described above, upon selecting a source image from P source images, the distances ΔE between each tile and R, G, and B tristimulus values are computed, and a source image with the smallest ΔE is selected. In this case, in place of selecting a source image with the smallest distance ΔE of R, G, and B tristimulus values, a source image having the second or third smallest distance ΔE of R, G, and B tristimulus values may be selected.

On the other hand, source images having the smallest, second smallest, and third smallest distances ΔE of R, G, and B tristimulus values may be selected in units of still images captured from a moving image.

A source image that has been selected for a given still image may be inhibited from being selected for another still image. Also, the number of times of selection of a source image may be limited (e.g., an identical source image can be selected up to three times).

As a result, in mosaic image generation processes for the respective frames, an identical source image is hardly selected or not selected at all, thus generating a moving mosaic image.

In order to shorten the time required for the moving mosaic image generation process or reduce the load on that process, the following measure can be taken. That is, when frames captured from a moving image have similar images, source images selected in the respective frames may assume close R, G, and B tristimulus values. Therefore, source images having R, G, and B tristimulus values close to those of a source image selected upon generating a mosaic image for the first frame are selected from the P source images, and are grouped. Upon generating mosaic images for the second and subsequent frames, a source image may be selected from the grouped source images.

As a result, since the number of source images from which target source images are selected can be reduced, the load on the process upon selecting a source image can be reduced, and the processing time can be shortened.

As described above, according to the fourth and fifth embodiments, a mosaic image can be generated using not only still images but also moving image data, and a moving mosaic image can be generated by simple processes.

[Sixth Embodiment]

The sixth embodiment of the present invention will be described below. Since the basic arrangement of the system of the sixth embodiment is the same as that shown in FIG. 12 of the fourth and fifth embodiment, a detailed description of common components will be omitted, and differences from the fourth and fifth embodiments will be mainly explained below.

In the sixth embodiment, individual tile images are moving images, and change along with an elapse of time. This embodiment aims at generating a mosaic image so that an image formed by pasting start frames of moving image tiles imitates a first still image, and an image formed by pasting end frames of moving image tiles imitates a second still image.

Figure 18:
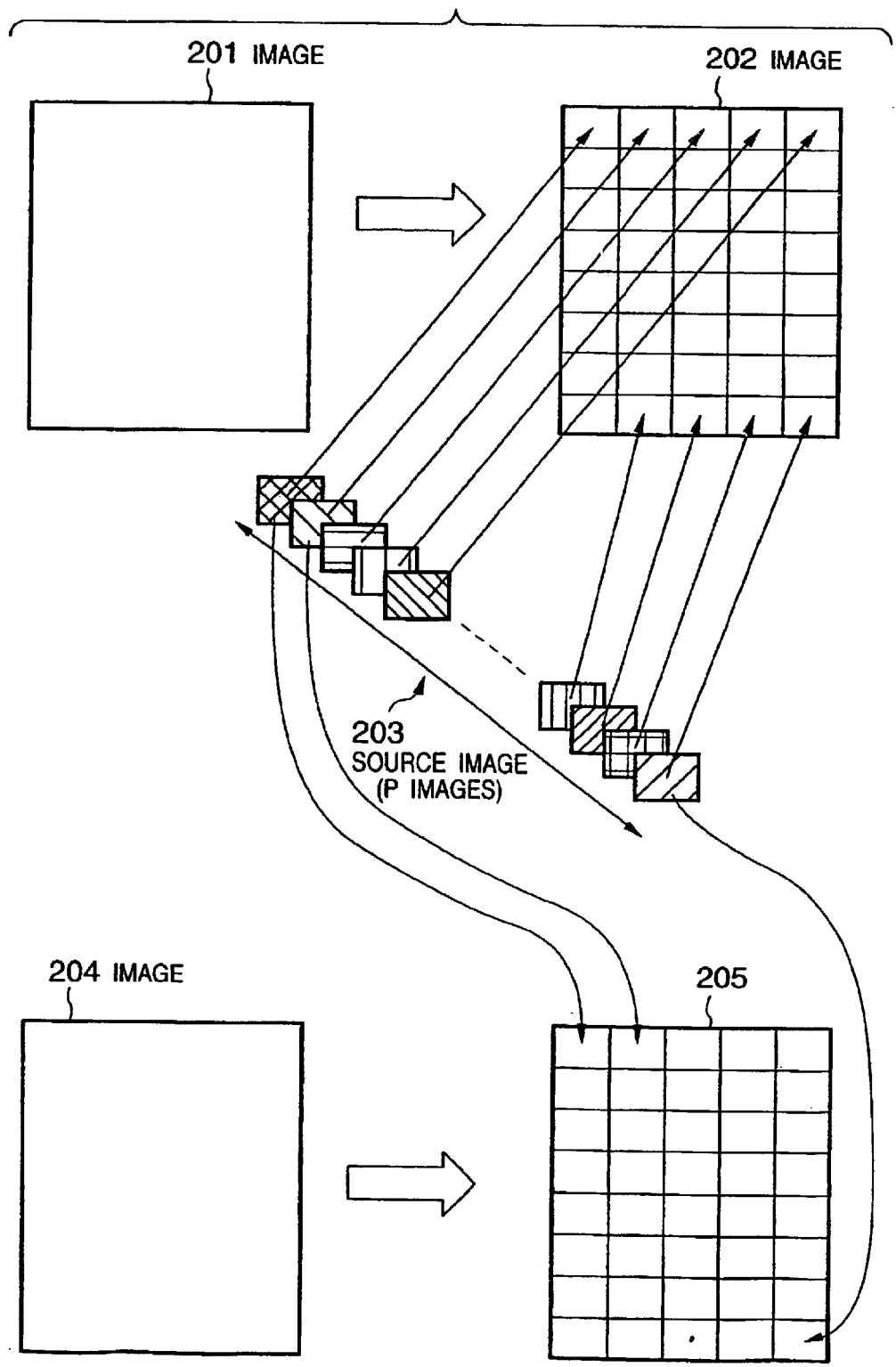
FIG. 18 is a view for explaining the processes upon generating a mosaic image in the sixth embodiment of the present invention.

An outline of a mosaic image generation method in the sixth embodiment with the above arrangement will be explained below with reference to FIG. 18. FIG. 18 is a view for explaining the relationship among a plurality of types of images used in the mosaic process of the sixth embodiment.

In the sixth embodiment, images 201 and 204 shown in FIG. 18 are original designs or images from which an image is composited by mosaicking. An image 202 is the first frame of a moving image composited using a plurality of small moving images (moving image tiles) by mosaicking. Source images 203 are source moving images from which images 202 and 205 are composited.

The number P of source moving images is normally a value large enough to prepare colors and textures required to obtain the second image 202. In this embodiment, the size of P source images is the same as that of a tile for the sake of simplicity. However, the size of each source image need not always match the tile size, and all P images need not always have equal sizes. When source images have different sizes, the size of each source image must be converted upon pasting that source image onto a given tile of the image 202. Note that P is sufficiently larger than M×N mentioned above.

An image 205 corresponds to an end frame of a synthesized moving image starting from the image 202, and the gist of the sixth embodiment is to select source images so that this image 205 becomes a mosaic image that imitates the image 204.

When all P source moving images do not have identical durations, they undergo compression or expansion in the time axis to adjust their durations upon pasting.

Figure 19:
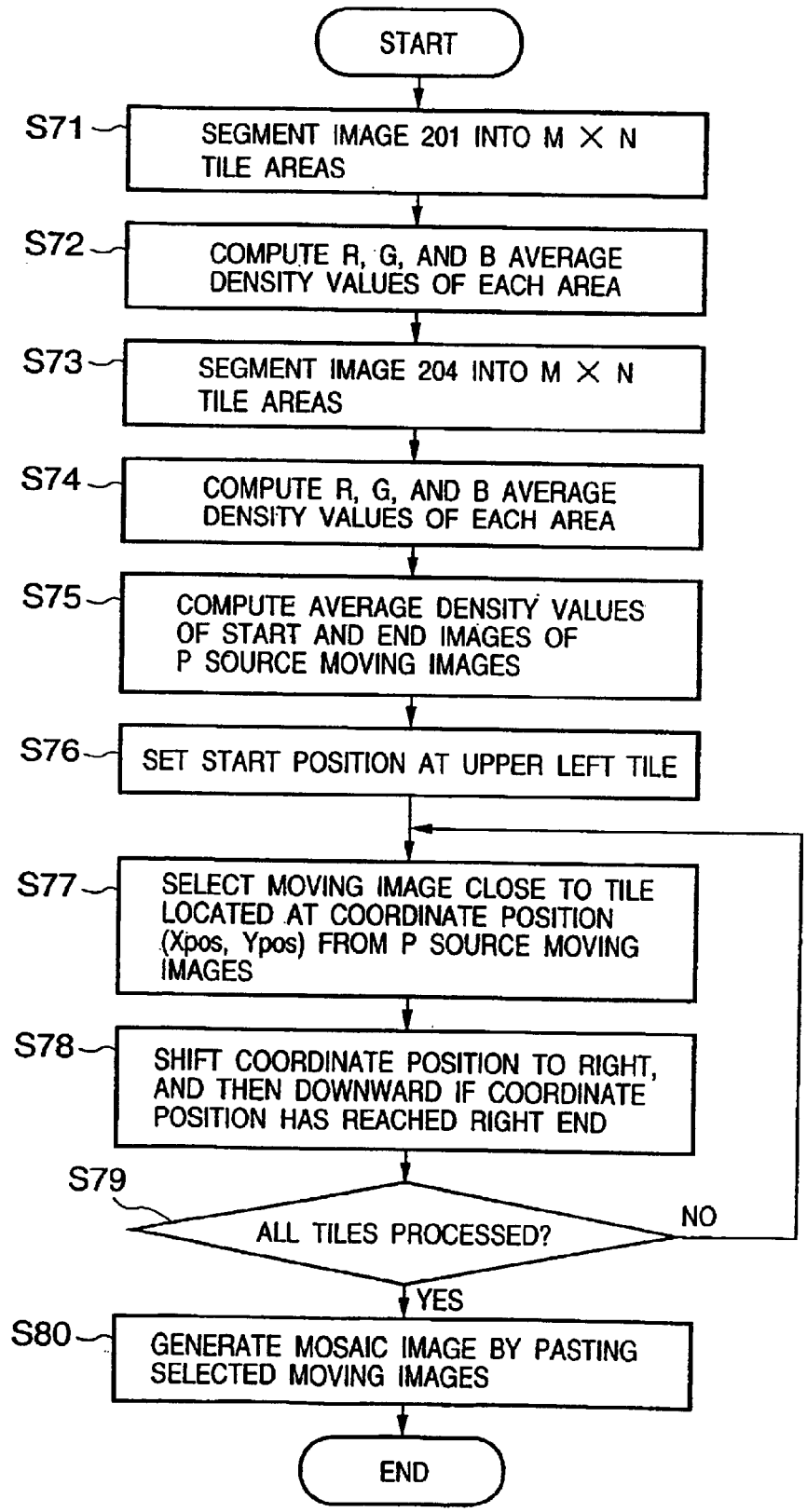
FIG. 19 is a flow chart for explaining an automatic generation process of a mosaic image in the sixth embodiment.

A moving mosaic image generation method of the sixth embodiment will be explained below with reference to FIG. 19. FIG. 19 is a flow chart showing an outline of the flow of the processing of the moving mosaic image generation method in the computer system of the sixth embodiment.

In the sixth embodiment, upon generating a moving mosaic image, the image 201 is segmented into M×N areas (tiles) in step S71. As a result of segmentation, the first image is divided into M×N rectangular tiles TL(0, 0), TL(1, 0), TL(2, 0), ..., TL(2, 4), and TL(3, 4), as shown in FIG. 20.

Figure 20:
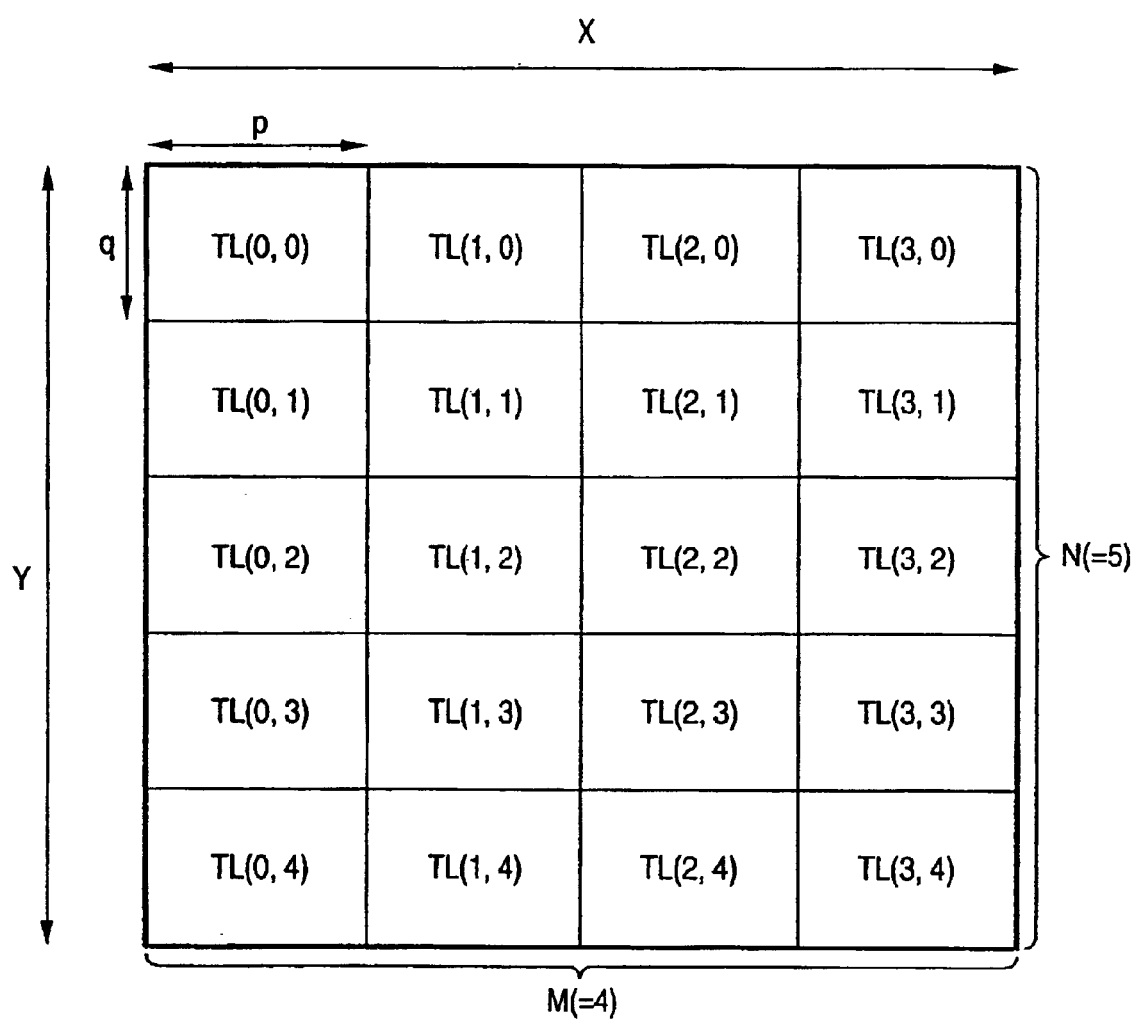
FIG. 20 is a view for explaining an example of an original image segmented into areas in the sixth embodiment.

FIG. 20 is a view for explaining an example of an original image segmented into areas according to the sixth embodiment.

Referring to FIG. 20, X and Y respectively represent the numbers of horizontal and vertical pixels of the image 201. Also, p and q respectively represent the numbers of horizontal and vertical pixels of each segmented tile. Hence, X=p×M and Y=q×N. In this case, all tile sizes are equal to each other for the sake of simplicity. However, the sixth embodiment is not limited to this, and the same control can apply even when tiles have arbitrary sizes and shapes. In such case, enlargement/reduction may be done as needed.

The color configuration of each tile that form a mosaic image in the sixth embodiment is the same as that in the first embodiment shown in FIG. 3.

Subsequently, in the process in step S72 in FIG. 19, the R, G, and B average density values of each of the M×N tiles segmented in step S71 are computed by:

$$Rd1\text{-}av = \Sigma Ri/(p \times q)$$

$$Gd1\text{-}av = \Sigma Gi/(p \times q)$$

$$Bd1\text{-}av = \Sigma Bi/(p \times q)$$

Note that "d1–av" means the average value of the first original image 201 (destination).

In step S73, the second original image 204 is segmented in the same manner as in step S71. In step S74, the R, G, and B average density values of each of M×N tiles segmented in step S73 are computed by:

$$Rd2\text{-}av = \Sigma Ri/(p \times q)$$

$$Gd2\text{-}av = \Sigma Gi/(p \times q)$$

$$Bd2\text{-}av = \Sigma Bi/(p \times q)$$

Note that "d2–av" means the average value of the second original image 201 (destination).

The flow then advances to step S75 to compute the R, G, and B average density values of each of the start frames of the P source images:

$$Rss\text{-}av = \Sigma Ri/(p \times q)$$

$$Gss\text{-}av = \Sigma Gi/(p \times q)$$

$$Bss\text{-}av = \Sigma Bi/(p \times q)$$

Note that "ss–av" means the average value of the start frame of a source (source; source image).

Furthermore, the R, G, and B average density values of each of the end frames of the P source images are computed by:

$$Rse\text{-}av = \Sigma Ri/(p \times q)$$

$$Gse\text{-}av = \Sigma Gi/(p \times q)$$

$$Bse\text{-}av = \Sigma Bi/(p \times q)$$

Note that "se–av" means the average value of the end frame of a source (source; source image).

The flow advances to step S76 to reset counters Xpos ($0 \leq Xpos \leq M-1$) and Ypos ($0 \leq Ypos \leq N-1$) indicating the position of a tile of interest to zero. Note that (Xpos, Ypos)=(0, 0) indicates the upper left tile position of the image 201.

The flow advances to step S77 to select a source image most suitable for the tile indicated by the position counters (Xpos, Ypos) from the P source images. In this selection method, distances $\Delta E$ of R, G, and B tristimulus values are computed, and a source image with the smallest $\Delta E$ is selected. An evaluation formula used in this case is:

$$\Delta E = (Rss\text{-}av - Rd0\text{-}av)^2 + (Gss\text{-}av - Gd0\text{-}av)^2 + (Bss\text{-}av - Bd0\text{-}av)^2 + (Rse\text{-}av - Rd1\text{-}av)^2 + (Gse\text{-}av - Gd1\text{-}av)^2 + (Bse\text{-}av - Bd1\text{-}av)^2$$

Based on this evaluation formula, a source image with the smallest $\Delta E$ is selected from the P source images.

In step S78, the tile of interest of the image 201 is shifted to the next position, and the flow then advances to step S79. It is checked in step S79 if the processes are complete for all the tile areas of the image 201. If NO in step S79, the flow returns to step S77 to repeat the aforementioned processes until the processes are completed.

On the other hand, if it is determined in step S79 that the processes are complete for all the tile areas of the image 201, the flow advances to step S80 to paste selected source images on corresponding positions to generate a moving mosaic image.

As described above, according to the sixth embodiment, a mosaic image can be generated using not only still images but also moving image data, and a moving mosaic image can be generated by simple processes.

That is, two original moving images are segmented into tiles, source moving images, the start images of which are similar to the tiles obtained by segmenting the first image, and the end images of which are similar to the tiles obtained by segmenting the second image, are selected, and the selected source moving images are pasted to synthesize a moving mosaic image. In this manner, a moving mosaic image can be easily generated.

To restate, according to the sixth embodiment, a mosaic image can be generated using not only still images but also moving image data, and a moving mosaic image can be generated by simple processes.

[Another Embodiment]

Original images are two different still images. However, original images may be two frames selected from a single moving image. In this manner, moving image mosaicking can be used as a special effect for moving images.

Also, moving image mosaicking may be used as a transition effect for smoothly connecting two moving images. In this case, the first original image is used as the end frame of the first moving image, and the second original image is used as the start frame of the second moving image.

The source moving images are stored in the HDD 206. However, the present invention is not limited to this. For example, a moving image capture device may be added, and a moving image signal from a VTR or DVD player may be captured as a source moving image.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When each of the above embodiments is applied to the storage medium, the storage medium stores program codes corresponding to descriptions of the aforementioned flow charts and control.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus capable of forming a mosaic image by combining source images, comprising:

storage means for storing a plurality of source images, including still images and moving images;

segmentation means for segmenting an image serving as a basis of the mosaic image into M×N tiles;

characteristic extraction means for obtaining image characteristics of the tiles segmented by said segmentation means;

selection means for selecting a source image, from said storage means, corresponding to each of the segmented tiles on the basis of the image characteristics obtained by said characteristics extraction means;

generation means for generating the mosaic image by pasting the source images selected by said selection means onto the tiles segmented by said segmentation means without overlapping the pasted source images; and playback means for, if a moving image is pasted as a source image onto the tiles, repetitively playing back the moving image on the tile.

2. The apparatus according to claim 1, wherein when the source image is a moving image, the characteristic extraction means obtains an image characteristic of the moving image from image characteristics of a plurality of still images in the moving image.

3. An image processing method for forming a mosaic image by combining source images, comprising the steps of:

storing in a storage means a plurality of source images, including still images and moving images;

segmenting an image serving as a basis of the mosaic image into M×N tiles;

a characteristic extracting step of obtaining image characteristics of the segmented tiles;

selecting a source image from said stored source images corresponding to each of the segmented tiles on the basis of the image characteristics obtained by said characteristic extracting step;

generating the mosaic image by pasting the source images selected by said selection step onto the segmented tiles without overlapping the pasted source images; and a playback step of, if a moving image is pasted as a source image onto the tiles, repetitively playing back the moving image on the tile.

4. The method according to claim 3, wherein when the source image is a moving image, an image characteristic of the moving image is obtained from image characteristics of a plurality of still images in the moving image.

* * * * *

UNITED STATES PATENT AND TRADEMARK OFFICE
CERTIFICATE OF CORRECTION

| | |
|---|---|
| PATENT NO. | : 7,012,623 B1 |
| APPLICATION NO. | : 09/537687 |
| DATED | : March 14, 2006 |
| INVENTOR(S) | : Kiyoshi Kusama et al. |

It is certified that error appears in the above-identified patent and that said Letters Patent is hereby corrected as shown below:

TITLE PAGE:
Item (56) References Cited FOREIGN PATENT DOCUMENTS,

Insert the following:
```
-- JP    10-269353   9/1998
   JP    4-24794     2/1992
   JP    63-222595   9/1988
   JP    56-46368    4/1981
   JP    7-302271    11/1995
   JP    56-46371    4/1981
   JP    9-512147    2/1997
   WO    95/28795    10/1995 --
```

COLUMN 4:
Line 1 "image" should read -- image is --.

COLUMN 5:
Line 38, " $(Gs\_av - Gd\_av)2$ " should read -- $(Gs\_av - Gd\_av)^2$ --.

COLUMN 7:
Line 10, "image," should read -- images, --
Line 56, "(X Pos, Y Pos)" should read -- (X_Pos,Y_Pos) --.

Signed and Sealed this

Twentieth Day of March, 2007

JON W. DUDAS
*Director of the United States Patent and Trademark Office*